United States Patent
Choi

(10) Patent No.: US 11,023,905 B2
(45) Date of Patent: Jun. 1, 2021

(54) ALGORITHM FOR IDENTIFICATION OF TRENDING CONTENT

(71) Applicant: Apple Inc., Cupertino, CA (US)

(72) Inventor: Brian D. Choi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 16/258,259

(22) Filed: Jan. 25, 2019

(65) Prior Publication Data

US 2020/0034857 A1 Jan. 30, 2020

Related U.S. Application Data

(60) Provisional application No. 62/703,335, filed on Jul. 25, 2018.

(51) Int. Cl.
*G06Q 30/00* (2012.01)
*G06Q 30/02* (2012.01)
*G06F 16/638* (2019.01)
*G06F 16/635* (2019.01)

(52) U.S. Cl.
CPC ....... *G06Q 30/0201* (2013.01); *G06F 16/635* (2019.01); *G06F 16/638* (2019.01); *G06Q 30/0282* (2013.01)

(58) Field of Classification Search
None
See application file for complete search history.

(56) References Cited

U.S. PATENT DOCUMENTS

| | | | |
|---|---|---|---|
| 8,819,025 B2 | 8/2014 | De Bona et al. | |
| 9,189,491 B2 | 11/2015 | Fushman et al. | |
| 9,442,987 B2 | 9/2016 | Nogues et al. | |
| 9,753,988 B1 | 9/2017 | McGilliard | |
| 2006/0010029 A1* | 1/2006 | Gross | G06Q 30/02 705/7.31 |
| 2012/0271884 A1* | 10/2012 | Holmes | G06Q 30/02 709/204 |
| 2014/0095307 A1* | 4/2014 | Dodson | G06Q 30/0255 705/14.53 |
| 2017/0193531 A1* | 7/2017 | Fatourechi | G06F 16/951 |
| 2017/0308794 A1 | 10/2017 | Fischerström | |

OTHER PUBLICATIONS

STIC EIC Search Report for 16258259 dated Sep. 28, 2020. (Year: 2020).*

* cited by examiner

*Primary Examiner* — Matthew T Sittner
(74) *Attorney, Agent, or Firm* — Dickinson Wright RLLP

(57) ABSTRACT

This application relates to techniques for recommending content to a user of a content distribution system. A server device can generate recommendations as part of a user interface for the content distribution system. The server device can be configured to: calculate a trend score for each of a plurality of digital assets managed by a content distribution system, calculate a recommendation score for a subset of digital assets that are not installed on a client device of a target user, calculate a breakout score for a subset of digital assets managed by the content distribution system each having a cumulative number of downloads below a threshold value, rank the digital assets according to the trend scores, the recommendation scores, or the breakout scores, and generate a visual representation of one or more digital assets to recommend to the user based on the ranking.

16 Claims, 13 Drawing Sheets

700

Installed Assets

| User ID | Asset 1 | Asset 2 | Asset 3 | ... | Asset M |
|---|---|---|---|---|---|
| User 1 | 1 | 0 | 1 | | 1 |
| User 2 | 1 | 1 | 1 | | 0 |
| User 3 | 1 | 0 | 1 | | 1 |
| User 4 | 1 | 0 | 1 | | 1 |
| User 5 | 0 | 0 | 1 | | 0 |
| ⋮ | | | | | |
| User N | 0 | 1 | 0 | | 0 |

Usage Frequency

| User ID | Asset 1 | Asset 2 | Asset 3 | ... | Asset M |
|---|---|---|---|---|---|
| User 1 | 25 | 0 | 18 | | 0 |
| User 2 | 3 | 67 | 4 | | 0 |
| User 3 | 7 | 0 | 2 | | 3 |
| User 4 | 38 | 0 | 21 | | 0 |
| User 5 | 0 | 0 | 14 | | 0 |
| ⋮ | | | | | |
| User N | 0 | 81 | 0 | | 0 |

*FIG. 8*

Trendsetters

| User ID | List of Digital Assets |
|---|---|
| User 1 | {*song_list*} |
| User 2 | {*song_list*} |
| User 3 | {*song_list*} |
| User 4 | {*song_list*} |
| User 5 | {*song_list*} |
| ⋮ | |
| User *L* | {*song_list*} |

*FIG. 11*

ALGORITHM FOR IDENTIFICATION OF TRENDING CONTENT

CROSS-REFERENCE TO RELATED APPLICATIONS

The present application claims the benefit of U.S. Provisional Application No. 62/703,335, entitled "ALGORITHM FOR IDENTIFICATION OF TRENDING CONTENT," filed Jul. 25, 2018, the content of which is incorporated herein by reference in its entirety for all purposes.

FIELD

The described embodiments relate generally to content distribution systems for digital assets. More particularly, the present embodiments relate to algorithms for ranking digital assets according to analysis of statistical data.

BACKGROUND

Music producers and software developers are increasingly distributing the content they produce through digital systems such as an e-commerce site, app store, console operating system, and the like. These digital systems can be referred to generally as content distribution systems. A client device such as a mobile phone, laptop computer, tablet computer, gaming console, or the like connects to a server through a client application or website and requests an application, game, or song be downloaded to their device. This is extremely convenient for the consumer as they have access to a large library of songs or applications on-demand, ready to be installed on their device through an Internet connection. This is also a benefit to music producers and software developers as the costs of distributing the content is extremely small.

However, the sheer volume of digital content that is available through these content distribution systems can create issues for the consumer. Lists of available applications or games can include tens of thousands of relevant titles. Sorting these lists by cumulative number of downloads to promote popular content is one way to navigate through these lists. However, newer releases will be obscured toward the bottom of these otherwise extremely long lists. Consumers can filter the lists by narrowing the list to specific categories or sub-categories to try to navigate to find titles that are relevant to them, but sometimes a consumer is simply looking for a new title from a broad number of categories that they might not have seen or used before, so filtering by narrow sub-categories is not useful in that situation. Notably, consumers can sometimes not have very many preferences for what they are looking for and might instead want to browse a catalog until what they see appears interesting.

Therefore, what is desired is new and effective techniques for filtering digital content within a catalog of digital assets managed through a content distribution system such that an e-commerce site, client application, or other distribution means can promote certain content to consumers.

SUMMARY

This paper describes various embodiments that relate to content distribution systems. More specifically, this paper describes algorithms for identifying trending content, recommended content, and breakout content. Trending content is identified based on a statistical analysis of historical download data for digital assets. Recommended content is identified based on a comparison of both download data and usage data of a target user with corresponding download data and usage data for similar users. Breakout content is identified by identifying users as trendsetters, and then recommending obscure digital assets downloaded by those trendsetters as potential breakout content.

In some embodiments, a method for identifying digital assets to recommend to a user is disclosed. The method includes calculating a trend score for each of a plurality of digital assets managed by a content distribution system, calculating a recommendation score for a subset of digital assets that are not installed on a client device of a target user, calculating a breakout score for a subset of digital assets managed by the content distribution system each having a cumulative number of downloads below a threshold value, ranking the digital assets based on the trend scores, and generating a visual representation of one or more digital assets to recommend to the user based on the ranking.

In some embodiments, calculating the trend score for each digital asset includes: collecting statistical data related to downloads of the digital asset from the content distribution system, identifying two or more time windows associated with the statistical data, fitting a line to the statistical data for each time window in the two or more time windows, and calculating a raw trend score for the digital asset by calculating a weighted sum of terms corresponding to each of the two or more time windows. Each term for a particular time window comprises multiplying a slope of the line fit to the statistical data within the particular time window by a coefficient of determination calculated for the line within the particular time window. In other embodiments, the curve fit to the statistical data can be a quadratic curve, an exponential curve, or an n-degree polynomial curve. In some embodiments, the two or more time windows include 7-day, 14-day, and 30-day windows.

In some embodiments, the raw trend score can be normalized to generate a normalized trend score. The normalization can be a min-max normalization. In other embodiments, the normalization can be non-linear.

In some embodiments, the raw trend score can be quantized to generate a quantized trend score. The quantization can be non-linear.

In some embodiments, generating the visual representation of one or more digital assets to recommend to the user includes: (1) selecting a number of digital assets according to the ranking; and (2) populating a list presented in a graphical user interface of a client application with the number of digital assets. In some embodiments, the visual representation is a hypertext markup language (HTML) document that includes elements for each of the one or more digital assets to recommend to a user.

In some embodiments, calculating the recommendation score for the subset of digital assets includes, for each user of a plurality of users of the content distribution system, calculating a similarity score for a particular user, selecting a number of users as similar users to the target user based on the similarity scores for each of the plurality of users, and calculating a recommendation score for the subset of digital assets that are not installed on a client device of the target user. The similarity score can be calculated by calculating a weighted sum of a first dot product of a vector of installation data corresponding to the particular user with a vector for the target user and a second dot product of a vector of usage data corresponding to the particular user with a vector of usage data for the target user.

In some embodiments, calculating the breakout score for the subset of digital assets includes identifying a set of digital assets having an established breakout date within a particular category of digital assets, identify one or more trendsetters for the particular category of digital assets, identify a list of digital assets within the particular category of digital assets downloaded by at least one trendsetter, filter the list of digital assets to exclude digital assets having a cumulative number of downloads above a threshold value, and calculating the breakout score for each digital asset in the subset of digital assets in the filtered list of digital assets by counting a number of trendsetters that have downloaded that digital asset. In some embodiments, trendsetters are identified within each genre of music in a plurality of different music genres.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 7 illustrates a chart showing the digital assets installed on a plurality of client devices, in accordance with some embodiments.

FIG. 8 illustrates a chart showing the usage information related to digital assets installed on a plurality of client devices, in accordance with some embodiments.

FIG. 11 illustrates a list of trendsetters, in accordance with some embodiments.

DETAILED DESCRIPTION

Figure 1:
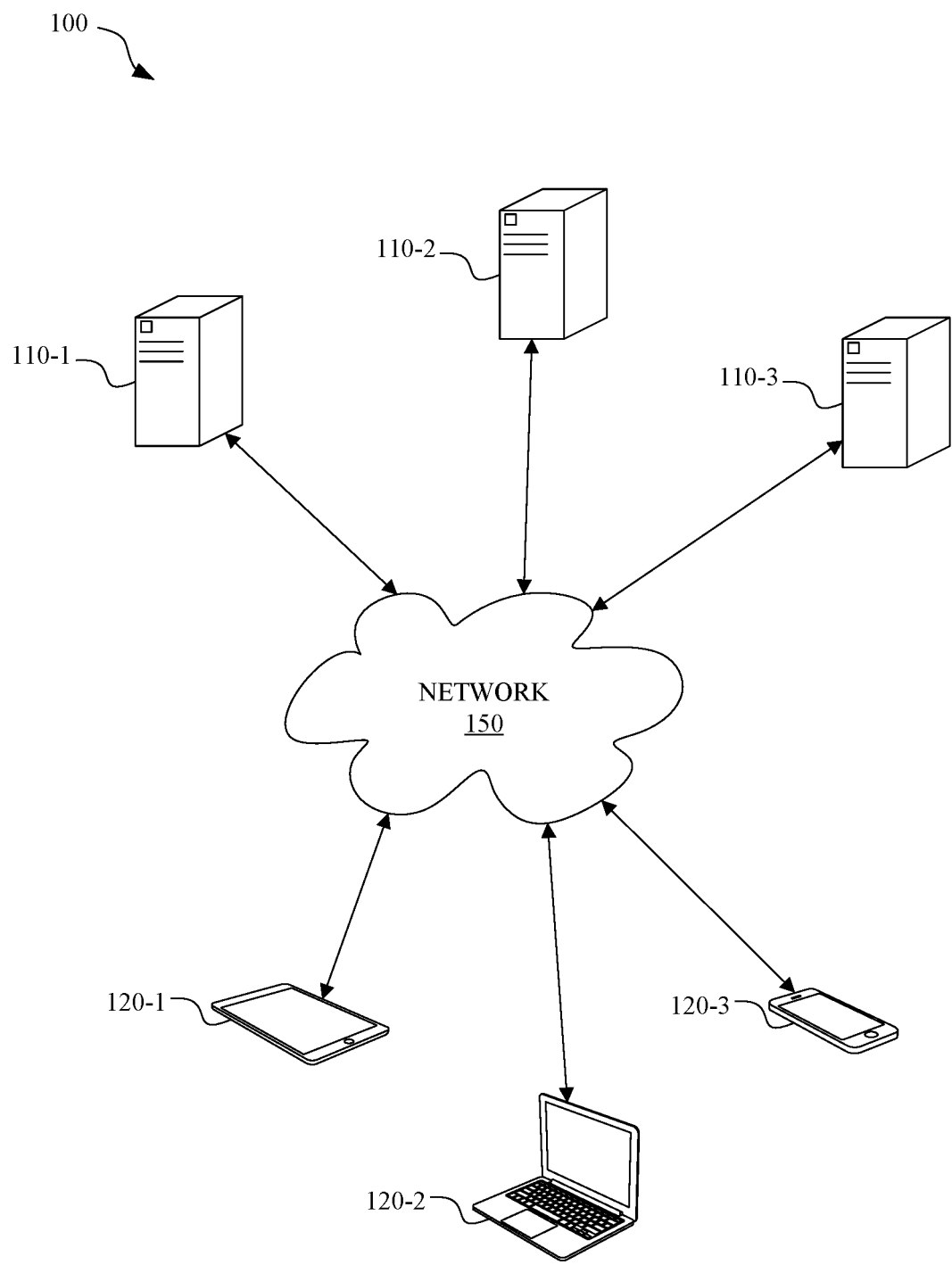
FIG. 1 illustrates a client-server architecture, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A content distribution system is disclosed in which a server device is configured to provide a recommendation of digital assets to a user via a user interface displayed on a client device. The digital assets can include applications, games, songs, movies, television shows or other types of digital programming, and the like. In some embodiments, a list of digital assets can be displayed in a user interface, where the order of the digital assets that appear in the list is based on a ranking of the digital assets according to a metric.

In some embodiments, the metric can comprise a trend score that indicates whether a particular digital asset is trending according to a statistical analysis of historical download data for the digital asset. A raw trend score can be calculated by fitting lines to different time windows of the historical download data. The raw trend score is a weighted sum of the product of the slope of the line with a coefficient of determination associated with the line for each of the time windows. The raw trend score can be normalized and/or quantized.

In some embodiments, the metric can comprise a recommendation score that indicates whether a particular digital asset is commonly installed on a client device associated with a number of similar users to a target user. For a target user, similar users can be identified by comparing installation data and usage data for each of the users with the target user. A similarity score can be calculated by taking a sum of weighted dot products of the installation data and the usage data, respectively, for the target user and corresponding other users. The weights can be dynamically adjusted based on an analysis of the installation data and/or usage data for the target user.

In some embodiments, the metric can comprise a breakout score that indicates whether obscure digital assets are likely to break out in the future based on their early adoption by one of a number of identified trendsetters within a particular category or genre of digital assets. Trendsetters can be identified by determining which users commonly download or install a digital asset prior to an established breakout date that indicates a time at which the digital asset began to gain in popularity and average daily downloads of the digital asset increase over time.

In some embodiments, the metric is based on a different factor, such as a cumulative number of downloads of the digital assets. However, the metric can then be adjusted based on at least one of the trend score, the recommendation score, or the breakout score.

These and other embodiments are discussed below with reference to FIGS. 1-14; however, those skilled in the art will readily appreciate that the detailed description given herein with respect to these figures is for explanatory purposes only and should not be construed as limiting.

FIG. 1 illustrates a client-server architecture 100, in accordance with some embodiments. The client-server architecture 100 includes a number of separate and distinct computing devices configured to communicate over a network 150. The client-server architecture 100 includes a number of server devices 110 and a number of client devices 120. As depicted in FIG. 1, the client devices 120 can include, but are not limited to, a tablet computer 120-1, a laptop computer 120-2, and a mobile device 120-3. It will be appreciated that the client-server architecture 100 can include other types of client devices 120 such as desktop computers, wearable devices (e.g., smart watches), personal digital assistants, game consoles, and the like.

In some embodiments, a client device 120 includes one or more applications configured to be executed by a processor of the client device 120. The applications can include an operating system that provides an operating environment for one or more additional applications. At least one application on the client device 120 can be a client application that is configured to interact with a service implemented by one or more server devices 110. Examples of a client application can include an e-commerce application, an app store, a music application, a game streaming application, and the like. Three server devices 110-1, 110-2, and 110-3 are depicted in FIG. 1, although it will be appreciated that fewer or greater numbers of server devices 110 can be included in the client-server architecture 100.

In some embodiments, a first server device 110-1 operates as a gateway device for one or more additional server devices, such as server devices 110-2 and 110-3. In such embodiments, the client devices 120 can send requests to the first server device 110-1, which forwards the requests to the appropriate back-end server device 110-2 or 110-3 for processing.

In some embodiments, at least one server device 110 hosts one or more services utilized by the applications included on the various client devices 120. For example, the first server device 110-1 can host a service that enables a client application to download digital assets to a client device 120. The first server device 110-1 can also communicate with the second server device 110-2 and/or the third server device 110-3, which can implement a database that includes a plurality of digital assets and a database that stores statistical information related to the digital assets, respectively. In some embodiments, services utilized by the application(s) can be hosted on more than one server device 110. For example, the database hosting a plurality of digital assets can be implemented as a distributed database hosted on a number of different server devices in a number of different data centers.

Figure 2:
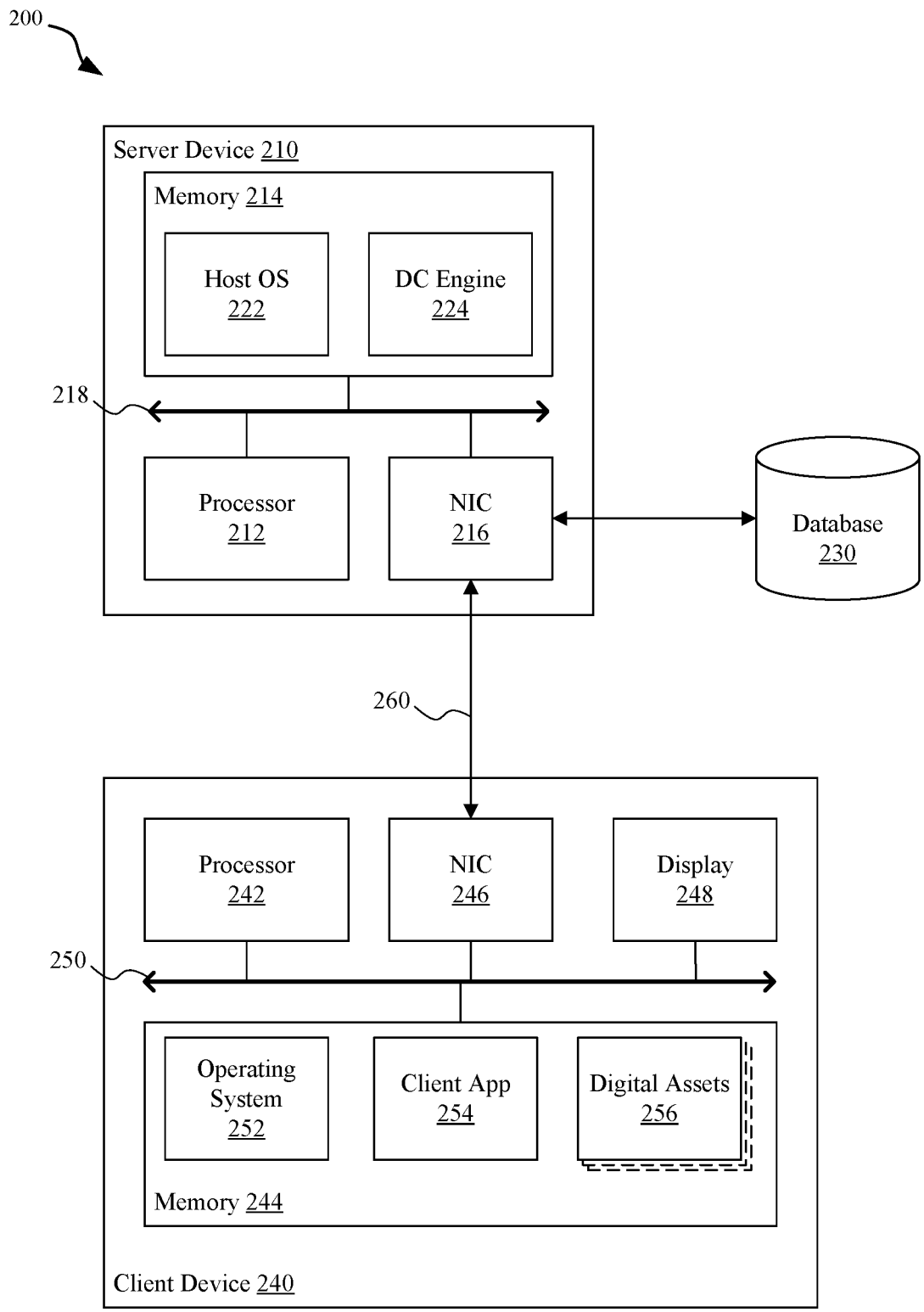
FIG. 2 illustrates a content distribution system for accessing digital assets stored on a remote server from a client device, in accordance with some embodiments.

FIG. 2 illustrates a content distribution system 200 for accessing digital assets stored on a remote server from a client device 240, in accordance with some embodiments. The system 200 includes a server device 210 in communication with the client device 240 over a communication channel 260. The server device 210 implements at least some aspects of a content distribution system 200 for accessing the digital assets. As used herein, digital assets refers to a set of digital resources that can be stored in a memory of a device. A digital asset can commonly refer to an application (e.g., an "app"), a video game, multimedia files (e.g., music or videos), and the like. In some embodiments, the content distribution system 200 includes a digital storefront for allowing users to purchase digital assets, which are then made available to download to one or more client devices associated with a user account.

In some embodiments, the server device 210 includes a processor 212, a memory 214, and a network interface controller (NIC) 216. The processor 212 and the NIC 216 communicate with the memory 214 via a system bus 218. The processor 212 can include a central processing unit (CPU) core configured to execute one or more applications stored in the memory 214 of the server device 210. The memory 214 can include volatile memory such as dynamic random access memory (DRAM) for storing applications being executed by the processor 212. The NIC 216 can include a network interface for communicating with other devices over a network such as the Internet. Although not shown explicitly, the server device 210 can also include additional components such as non-volatile memory (e.g., hard disk drives, solid state drives, etc.), a parallel processing unit (e.g., a graphics processing unit), and any other types of electronic components typically included in a server device 210. In some embodiments, the server device 210 is a blade server included in a chassis installed on a rack of a data center. In such embodiments, the server device 210 can be one of many such server devices installed in the data center, with multiple blade servers in each chassis and multiple chassis disposed on each rack in the data center.

As depicted in FIG. 2, the memory 214 includes a host operating system (OS) 222 and a digital content (DC) engine 224. The host OS 222 provides an operating environment for one or more applications executed by the processor 212 substantially simultaneously (e.g., either in a time division multiplexed fashion or in a true parallel system with multiple CPU cores). The DC engine 224 implements various logic associated with the content distribution system 200. For example, the DC engine 224 can provide logic for serving hypertext markup language (HTML) documents for an e-commerce site accessible through a client application or a browser application of a client device 240. The DC engine 224 can also provide logic for ranking digital assets in the content distribution system 200.

In some embodiments, the server device 210 is connected to a database 230. The database 230 can be a distributed database hosted on a number of additional server devices. In some embodiments, the database 230 includes a number of tables. For example, a table can be used to associate an asset identifier with a location of the digital asset in a block data store or network storage service. Another table can associate the asset identifier with metadata related to the digital asset, such as a title of the digital asset, a producer of the digital asset, a date the digital asset was produced, a size of the digital asset, a category or genre of the digital asset, and so forth. Yet another table can store statistical information that associates the digital asset with statistical information related to the distribution of the digital asset. For example, the table can include statistical information that identifies how many times the digital asset has been downloaded over a period of time (e.g., downloads per day, downloads per week, downloads per hour, etc.), the geographical distribution of said downloads (e.g., downloads per country, region, etc.), and the like. It will be appreciated that the database 230 can be a relational database that uses a structured query language (SQL) to access values in the tables described above. Alternatively, the database 230 can be a NoSQL database such as Apache® Cassandra or Apache® FoundationDB and the like. In such embodiments, the values in the tables described above can be stored in a different format (e.g., key-value pairs) and accessed in a manner according to that format.

A client device 240 is in communication with the server device 210 through the communication channel 260. In some embodiments, the client device 240 includes a processor 242, a memory 244, a NIC 246, and a display 248. The processor 242, the NIC 246, and the display 248 communicate with the memory 244 via a system bus 250. The processor 242 is configured to execute an operating system (OS) 252, stored in the memory 244, which provides an operating environment for additional applications executed on the client device 240. For example, the OS 252 can provide a graphical user interface that includes icons related to different applications installed on the client device. The processor 242 is also configured to execute a client application 254, stored in the memory 244, which provides a user interface to download digital assets 256 from the database 230 via the content distribution system 200. The digital assets 256 can include applications, games, music, videos, and the like.

Figure 3:
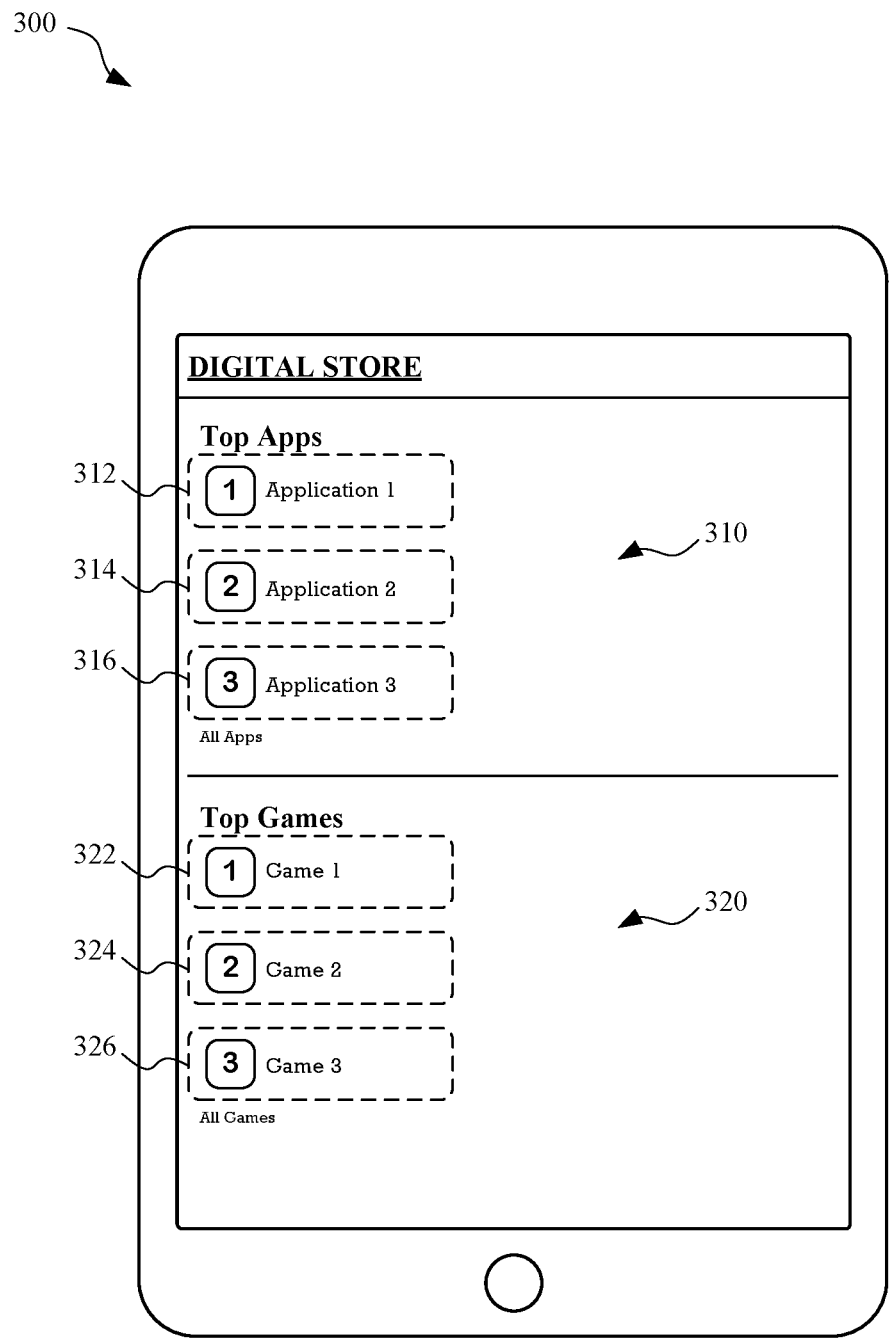
FIG. 3 illustrates a graphical user interface (GUI) for a client application, in accordance with some embodiments.

FIG. 3 illustrates a graphical user interface (GUI) 300 for a client application 254, in accordance with some embodiments. In some embodiments, the client application 254 can represent a user interface for an e-commerce site managed by a content distributor. The client application 254 can be implemented as a stand-alone application configured to be executed within the operating environment provided by the OS 252. Alternatively, the client application 254 can be a web browser application configured to display the contents of an e-commerce website. In either case, the client application 254 can be dynamically driven using website resources generated by the DC engine 224 or other web servers managed by the content distributor. The website resources can include HTML documents, extensible markup language (XML) documents, JavaScript Object Notation (JSON) documents, multimedia documents, and the like.

In some embodiments, the GUI 300 includes a visual representation of the digital assets available for purchase and/or download from the content distribution system 200. For example, the GUI 300 can display lists or charts of digital assets in a particular category. The digital assets in the database 230 can be ranked by the DC engine 224, and the DC engine 224 can compare the rankings to populate the lists or charts. Lists or charts can be created for different categories of digital assets. For example, as depicted in FIG. 3, the GUI 300 includes a first list 310 of applications and a second list 320 of games. The first list 310 includes a visual representation of a first app 312, a second app 314, and a third app 316, ranked in order. The second list 320 includes a visual representation of a first game 322, a second game 324, and a third game 326, ranked in order. Each of the lists also includes a user interface element (e.g., a mapped region of the display, a hyperlink, etc.) to display additional digital assets not included in the lists (e.g., digital assets ranked below those digital assets shown in the lists).

It will be appreciated that the GUI 300 provides a means for displaying digital assets that are available for purchase or download from the content distribution system 200. However, the content distribution system 200 can include thousands of digital assets in any given category, much too great a number than a user could ever conceivably navigate through efficiently in a given list. One way to manage such content is to further divide the digital assets into smaller and smaller sub-categories, providing a user with much smaller lists of digital assets related to a particular sub-category. For example, applications could be divided into entertainment, productivity, communication, and other similar categories to divide the digital assets in the applications category into different sub-categories. In addition, a search function could be provided to search through the digital assets using a keyword query.

Various algorithms are implemented by content distributors to automatically rank the digital assets within a content distribution system 200. For example, one naïve ranking scheme tracks total number of downloads of each digital asset. The DC engine 224 can then rank the digital assets in a given category according to the total number of downloads for the various digital assets. The top N digital assets by rank are then included in a list for that category displayed in the GUI 300. However, this simple algorithm results in very little variety over time as the lists would typically include the same top digital assets, historically, in a given category. One technique that accounts for staleness of downloads can limit the download data to a pre-determined time period. For example, rankings can be based on total number of downloads in the previous 6 weeks. Thus, new digital assets having large numbers of downloads within a recent time period can outrank other digital assets that have historically a greater number of downloads overall, but fewer downloads in the same recent time period. Alternatively, a historical ranking can be modified by promoting trending content such that the ranking is adjusted based on increased number of downloads within a recent time period. However, many of these algorithms are simply ineffective. For example, algorithms that promote trending content aren't sufficient to compensate for lack of historical trends for a given digital asset; or algorithms over-promote digital assets that are too obscure due to a spike in downloads on a given day. Consequently, more advanced algorithms are desired.

Algorithm for Identifying Trending Content

There is a desired goal to identify and promote trending content within a content distribution system 200. Trending content refers to a digital asset where a trend has formed of increasing downloads over a most-recent period of time. In some embodiments, a list can be compiled that ranks digital assets based on a trend score for the digital assets. In other embodiments, a trend score for the digital assets can be utilized to modify a ranking associated with a list of digital assets. For example, a trend score can be utilized to promote trending content and increase the ranking of the digital assets associated with trending content when the ranking is based on criteria other than the trend score.

Figure 4:
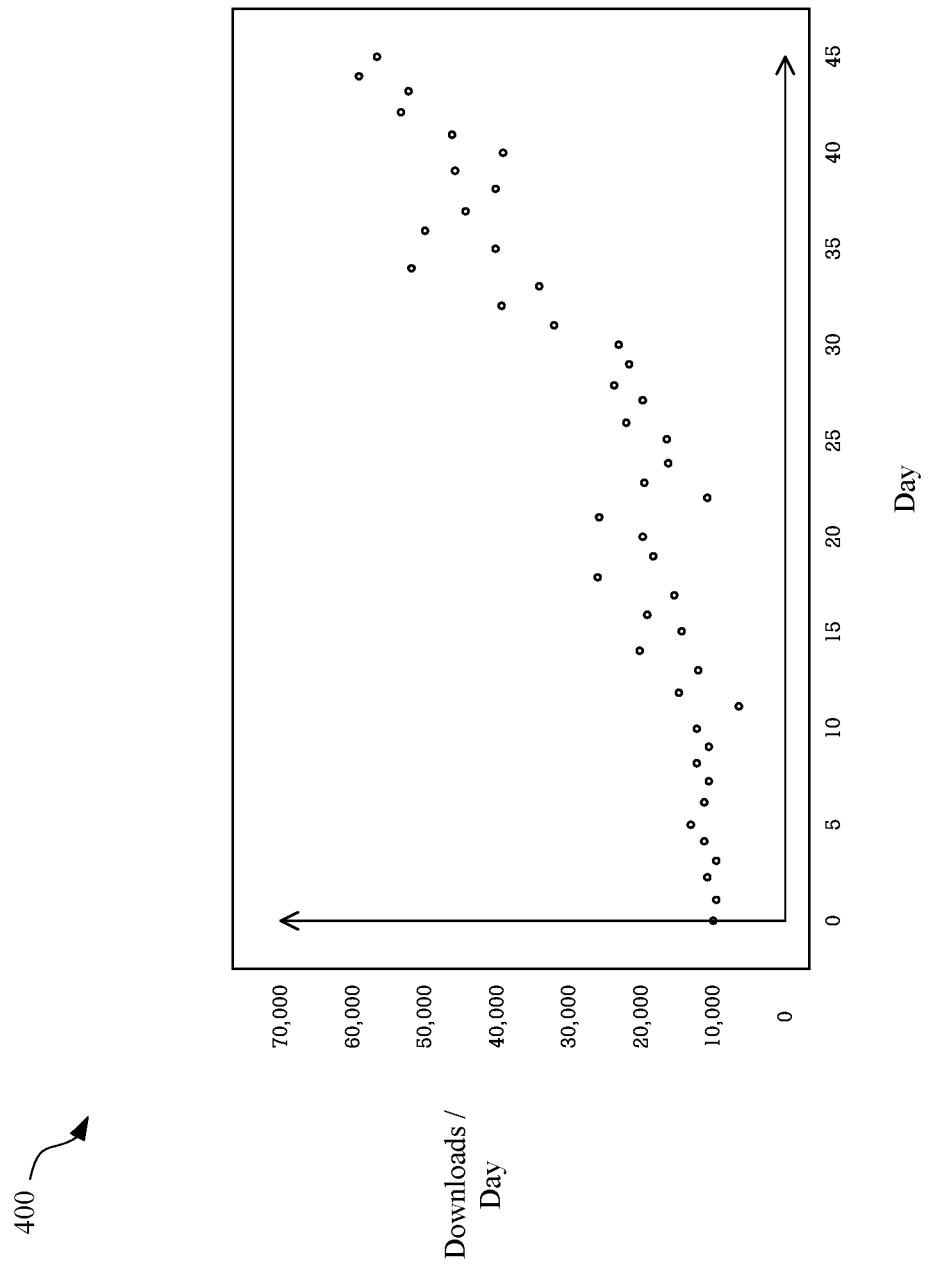
FIG. 4 illustrates a chart of historical download history for a digital asset, in accordance with some embodiments.

FIG. 4 illustrates a chart 400 of historical download history for a digital asset, in accordance with some embodiments. As depicted in FIG. 4, the chart 400 tracks the download history for the digital asset for 45 days. The points plotted in the chart represent a total number of downloads of the digital asset in a given day. The term download can refer to a request received by a service implemented on a server device included in the database 230 to retrieve a copy of the digital asset from the database 230.

It will be appreciated that the time period (e.g., 45 days) shown in the chart 400 and the range of the number of downloads (e.g., [0, 70,000]) shown in the chart 400 are for illustrated purposes. Each digital asset can be tracked over a different time period (e.g., 30 days, 90 days, etc.), for a different variable (e.g., downloads per hour, downloads per week, etc.), and over a different range (e.g., [0, 100], [0, 1,000], etc.).

Over time, the number of downloads of a digital asset per day will vary. However, as a digital asset increases in popularity through word of mouth or other promotional activities, the number of downloads per day can increase.

Sometimes, a trend emerges where the number of downloads experiences sustained growth. This sustained growth can be a leading indicator that the digital asset may go viral (e.g., experience a massive growth in popularity due to information spreading through word of mouth, the Internet, or other media). In some cases, a promotion run by a content producer, such as a sale on the price of the digital asset, can increase downloads for a short time. While this short term trend might appear to have the same leading indicators that the digital asset may go viral, the number of downloads per day for the digital asset are likely to return to a pre-sale baseline once the incentive of a lower price is removed.

Naïve algorithms for attempting to identify trending content simply compare a number of downloads in a current time frame (e.g., a day, a week, etc.) to a previous time period to identify trending content. Alternatively, an algorithm might track a moving average over a short time frame and a moving average over a long time frame, taking a difference between the short term moving average and the long term moving average to identify trending content. While these types of algorithms may work to identify trending content, the algorithms have certain deficiencies. For example, such algorithms can be susceptible to promoting content based on short term effects unrelated to longer term trends. For example, the sale price can spike downloads in a given day or over a period of days that will cause such algorithms to identify the digital asset as trending when the increase is unrelated to an underlying user satisfaction with the digital asset. A single day or even two to three days may be insufficient in some instances to identify the increase in downloads as a sustained trend. In addition, such simple algorithms are subject to easy manipulation by content producers that would like to game the content distribution system to promote their content as trending by artificially inflating the download requests in a given time frame.

In some embodiments, a trending algorithm is implemented to calculate a trend score for a digital asset based on an analysis of statistical data related to the digital asset. The trending algorithm includes steps of: collecting statistical data related to downloads of a digital asset, identifying two or more time windows associated with the statistical data, fitting a curve to the statistical data within each of the time windows, and calculating a trend score for the digital asset based on coefficients within the curves and a measurement of the quality of the fit with the statistical data.

Figure 5:
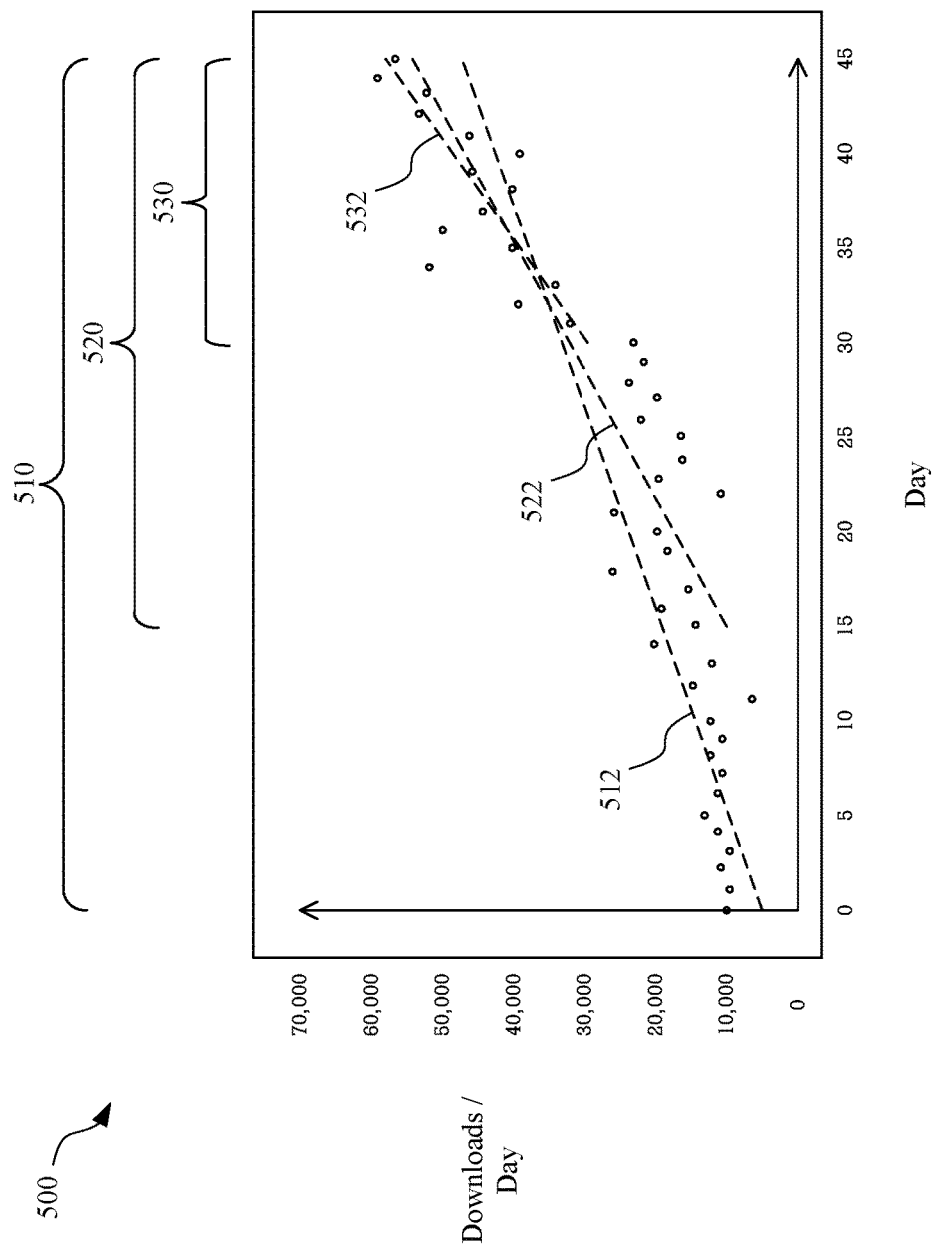
FIG. 5 illustrates at least some aspects of the trending algorithm, in accordance with some embodiments.

FIG. 5 illustrates at least some aspects of the trending algorithm, in accordance with some embodiments. As depicted in FIG. 5, the statistical data collected for a digital asset includes a number of downloads of a digital asset for each of a plurality of days over a collection period. The statistical data is plotted in the chart 500. A number of time windows associated with the statistical data are identified. A time window refers to a sub-division of time within the total collection period. In some embodiments, the time windows overlap and include the most recent data point of the statistical data within the collection period. In other words, each of the windows corresponds to a different time-frame within the collection period starting at a common most recent time and extending back to different previous times for each time window.

As depicted in FIG. 5, a first window 510 of 45 days, a second window 520 of 30 days, and a third window 530 of 15 days are identified within the collection period of the statistical data. A curve is fit to the data in each of the windows. In some embodiments, the curve is a line of the form:

$$y=bx+c \qquad \text{(Eq. 1)}$$

The variable x is the day ranging from day $d_0$ at the start of the window to day $d_{i-1}$ at the end of the window, where i is the number of days in the window. The coefficients b and c are the slope of the line and the intersection of the line with the y axis, respectively. The curve can be fit to the statistical data using any well-known curve fitting algorithm such as a linear regression algorithm or a least squares algorithm to determine the coefficients b and c. In other embodiments, other types of curves can be fit to the data, such as a quadratic curve (e.g., $y=ax^2+bx+c$), an exponential curve (e.g., $y=ae^{bx}$), or an n-degree polynomial curve (e.g., $y=\Sigma_0^n a_i x^i$).

It will be appreciated that a line is selected as one exemplary type of curve to fit to the statistical data because a line identifies the overall trend of the number of downloads per day within the time window without trying to match any short term variance of the data. The slope of the line, therefore, represents the average daily increase in the number of downloads over the period of time within the time window. A trend score is then calculated based on the slopes of multiple, overlapping time windows corresponding to measurements of the average increase in daily downloads over different time periods. If the slopes of the lines fit to the different time windows increase as the time window gets smaller and smaller, then that indicates a trend that the number of downloads is accelerating as time advances. However, if the slopes of the lines fit to the different windows first increases and then decreases as the window gets smaller and smaller, then that indicates that the trend may not be sustained and could represent a short term spike in downloads due to other effects (e.g., a sale on the price of a digital asset, an advertising campaign for the digital asset, etc.).

In some embodiments, a raw trend score is calculated based on the slopes of the lines fit to the statistical data within two or more overlapping time windows. A raw trend score for the three time windows depicted in FIG. 5 can be calculated according to the following equation:

$$T_{raw}=\omega_{45}(b_{45})+\omega_{30}(b_{30})+\omega_{15}(b_{15}) \qquad \text{(Eq. 2)}$$

Generally, the raw trend score is calculated as a weighted sum of the slopes from each of the lines fit to two or more overlapping windows of the statistical data. In some embodiments, the weights are constant (e.g., $\omega_{45}=1$, $\omega_{30}=1.5$, and $\omega_{15}=2$). In other embodiments, the weights are dynamically adjusted based on a measurement of the fit of the curve to the statistical data.

In some embodiments, the weights are dynamically adjusted based on a coefficient of determination, denoted as $r^2$. The coefficient of determination indicates how well the statistical data fits the curve or, in this case, the line. An $r^2=1$ indicates that the line fits the statistical data perfectly (e.g., all points in the statistical data fall on the line or curve), while an $r^2=0$ indicates that the line does not fit the statistical data at all. More specifically, $r^2$ can be calculated as follows:

$$r^2 \equiv 1 - \frac{\sum_i (y_i - f_i)^2}{\sum_i (y_i - \bar{y})^2} \qquad \text{(Eq. 3)}$$

In Equation 3, the term $f_i$ refers to the predicted value corresponding to the $i^{th}$ data point based on the line or curve, and the term $\bar{y}$ refers to the statistical mean of the n data points, which can be calculated as:

$$\bar{y} = \frac{1}{n}\sum_{i=1}^{n} y_i \qquad \text{(Eq. 4)}$$

The value of $r^2$ can be calculated for each line associated with a given time window, and the weight for the term of the raw trend score corresponding to that time window can be adjusted dynamically based on the value of $r^2$. In some embodiments, the weights are calculated as a scaled version of $r^2$. More specifically, a weight $\omega$ can be calculated dynamically as:

$$\omega = s \cdot (r^2) \qquad \text{(Eq. 5)}$$

In equation 5, the term s refers to a scale value, which is similar to the constant weights corresponding to each of the different windows described above (e.g., $s_{45}=1.0$, $s_{30}=1.5$, $s_{15}=2.0$).

In other embodiments, the weights are dynamically adjusted based on a variance of the statistical data given by:

$$\sigma^2 = \frac{1}{n-1}\sum_i (y_i - \bar{y})^2 \qquad \text{(Eq. 6)}$$

It will be appreciated that, unlike the coefficient of determination, the variance does not measure a correctness of the fit of the line or curve to the statistical data but instead provides a measure of the spread of the data in comparison to the statistical mean of the data points.

In some embodiments, the raw trend score scales the slope based on a standard deviation of the statistical data, which refers to the square root of the variance as given in Equation 6. The raw trend score can incorporate scaling of the slope as well as dynamically adjusting the weights according to the following equation:

$$T_{raw} = s_{45}(r_{45}^2)\left(\frac{b_{45}}{\sigma_{45}}\right) + s_{30}(r_{30}^2)\left(\frac{b_{30}}{\sigma_{30}}\right) + s_{15}(r_{15}^2)\left(\frac{b_{15}}{\sigma_{15}}\right) \qquad \text{(Eq. 7)}$$

The size of the time windows are important to developing the raw trend score. It will be appreciated that an example using 15, 30, and 45-day windows is depicted in FIG. 5. However, the windows can be adjusted for different applications. In some case, 7, 14, and 30-day windows can be implemented, which shortens the time frame of interest when looking for trends in the statistical data. In other cases, 30, 60, and 90-day windows can be implemented, which lengthens the time frame of interest when looking for trends in the statistical data. Generally, the size and number of overlapping windows within the statistical data can be tailored to a specific application. For example, some types of digital assets or groups of users might be quicker to react to trends than others and, as such, the appropriate selection of the number and size of the windows can be adjusted based on an analysis of historical trends of the statistical data. In some embodiments, the raw trend score incorporates four or more terms corresponding to four or more time windows. In other embodiments, the raw trend score incorporates as few as two terms corresponding to two time windows.

For example, in one exemplary embodiment, a raw trend score can be calculated for a number of applications maintained within a content distribution system 200. The following trend score equation was found suitable for identifying trending content within the suite of applications:

$$T_{raw} = (r_{30}^2)\left(\frac{b_{30}}{\sigma_{30}}\right) + 1.5(r_{14}^2)\left(\frac{b_{14}}{\sigma_{14}}\right) + 2.0(r_7^2)\left(\frac{b_7}{\sigma_7}\right) \qquad \text{(Eq. 8)}$$

More specifically, 30-day, 14-day, and 7-day windows were defined for statistical data related to a number of downloads per day over the most recent 30-day period. Three lines were fit to the statistical data within the 30-day period, each line corresponding to a subset of the data within each of the 30-day, 14-day, and 7-day windows. The coefficient of determination, the standard deviation, and the slope of the line were determined for each of the three windows and utilized to calculate the raw trend score for each application according to Equation 8, set forth above. The applications can then be ranked based on the raw trend score. The ranking can be utilized by the DC engine 224 to generate a list within a GUI 300 for advertising the availability of trending applications.

In some embodiments, the raw trend score can be normalized to a defined range of values. Because the calculated slopes can technically be very large based on large increases in the data points included within a window, especially within small windows, the raw trend score is nearly unbound. In practice however, the slope of a line fit to the data points will be limited based on the range of the number of downloads of a digital asset that can actually be handled by the content distribution system 200. Working with the raw trend score in any type of algorithm that performs calculations could be difficult given the large variation in range of the raw trend score. Once solution is to normalize the raw trend score to generate a normalized trend score.

In some embodiments, the normalization comprises a min-max normalization. More specifically, a minimum trend score and a maximum trend score for a set of digital assets is determined, and each of the raw trend scores for the digital assets in the set of digital assets is scaled to a value between 0 and 1 as calculated according to a ratio between the difference between the raw trend score and the minimum trend score and a size of the range between the minimum trend score and the maximum trend score. In other embodiments, the raw trend scores can be capped at a pre-determined maximum raw trend score, and the raw trend scores can be normalized to a range based on a ratio between the raw trend score and the maximum trend score.

In other embodiments, the normalization is non-linear. For example, the normalization can include taking the log of the raw trend score and then normalizing the logarithmic values using, e.g., a linear method such as the min-max normalization described above. This non-linear normalization can be effective where many of the trend scores cluster at a low end of the range but there are a small number of outliers at the high end of the range.

In some embodiments, the normalized trend score can be quantized. Although a normalized trend score having a floating point value between 0.0 and 1.0 can be useful for some software applications or algorithmic solutions, users may prefer to visualize trending content according to a quantized scale. For example, the normalized trend scores between 0.0 and 1.0 can be mapped to a set number of quantized values (e.g., 1, 2, 3, etc.). It will be appreciated that the mapping does not have to be evenly distributed within the normalized range. For example, a quantized value of 1 can be assigned to normalized trend scores within the range of [0.0, 0.5), a quantized value of 2 can be assigned to normalized trend scores within the range of [0.5, 0.8), and a quantized value of 3 can be assigned to normalized trend scores within the range of [0.8, 1.0]. The quantized values can then be presented to users in the GUI 300, such as by showing a number of stars between 1 and 5 that indicates a relative level of the trend score.

In some embodiments, the normalized trend score can be adjusted based on other criteria. For example, a staleness score could be calculated to account for the overall age of a digital asset. A newer digital asset that shows a trend of increasing downloads is much more likely to be the result of the digital asset going viral than an older digital asset that has been available for a long time without experiencing such trends. Therefore, a staleness score could assign a value between 0.0 and 1.0 that indicates an age of the digital asset, with 1.0 corresponding to newer assets and 0.0 corresponding to old assets. The staleness score can be multiplied by the normalized trend score to reduce the normalized trend score of older assets, thereby promoting newer digital assets over older digital assets. As another example, a freshness score could be calculated to account for digital assets that might not have a full set of statistical data. Recall that the longest window can often be 30, 45, or even 90 days long depending on the implementation of a given application. Some digital assets may have been released within that time period and, therefore, the statistical data for all time periods prior to the release will show zero downloads per day. This can affect the calculated slope of the curve fit to the statistical data within said time windows. The freshness score could assign a value between 1.0 and 2.0, for example, that attempts to partially correct for a lower raw trend score caused by one or more terms of the raw trend score being calculated using insufficient statistical data. The freshness score can be multiplied by the normalized trend score to increase the normalized trend score of newer assets, thereby promoting newer digital assets over older digital assets.

It will be appreciated that although the staleness score and the freshness score are described as being used to scale the normalized trend score, in other embodiments, the staleness score or freshness score can be added to the normalized trend score to calculate an adjusted normalized trend score. Alternatively, scores based on similar or other criteria could be calculated within a scale corresponding to the raw trend score and added to the raw trend scores prior to normalization/quantization.

Figure 6:
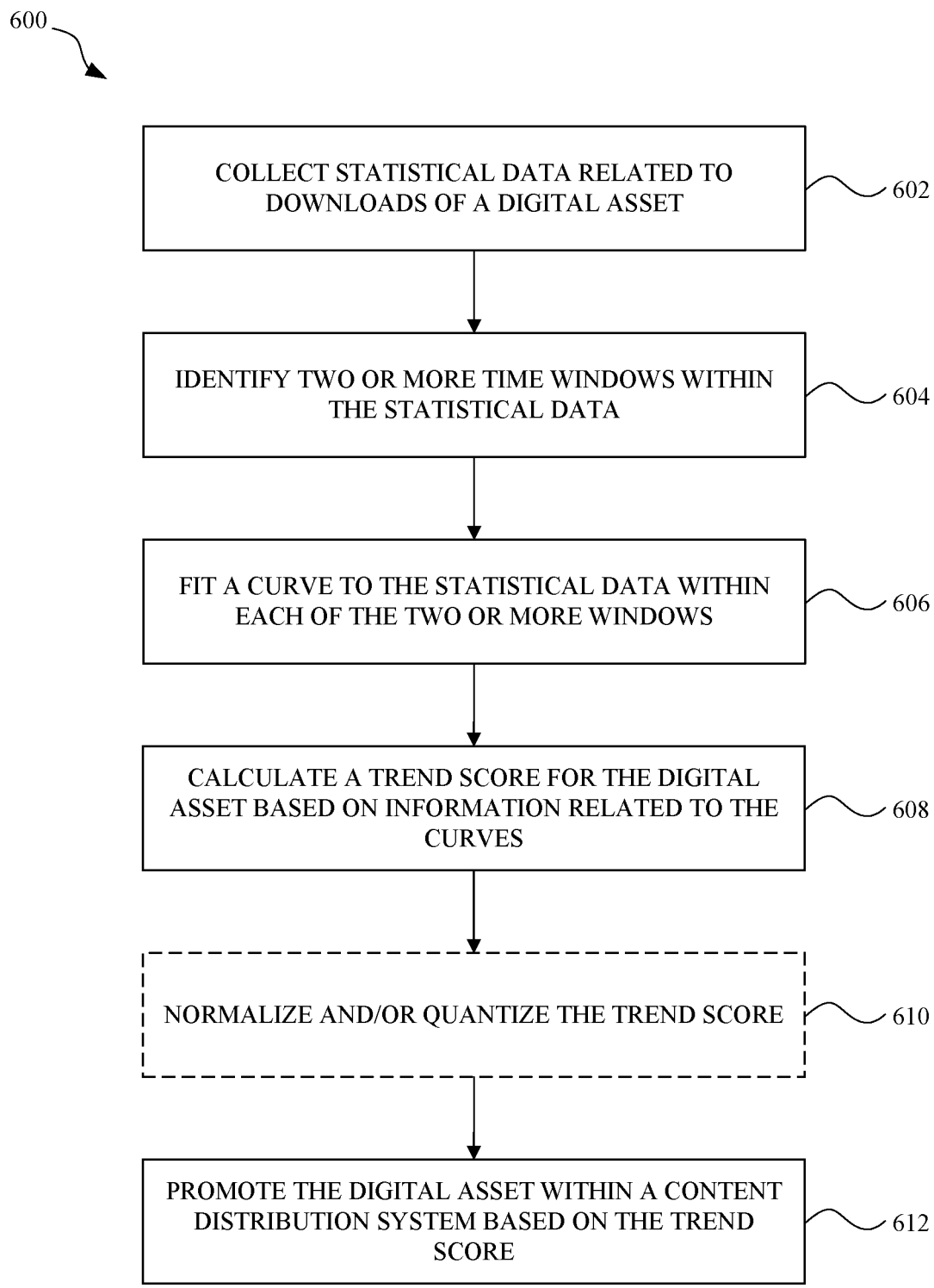
FIG. 6 illustrates a method for identifying trending content, in accordance with some embodiments.

FIG. 6 illustrates a method 600 for identifying trending content, in accordance with some embodiments. The method 600 can be performed by hardware, software, or some combination of hardware or software. In some embodiments, the method 600 can be implemented, at least in part, by the DC engine 224 of the content distribution system 200 when populating lists for display to a user in a client application 254 of a client device 240.

At 602, statistical data related to downloads of a digital asset within a content distribution system is collected. In some embodiments, the statistical data comprises a number of data points, each data point reflecting a number of downloads of the digital asset within a given time period, such as a day.

At 604, two or more time windows are identified within the statistical data. In some embodiments, three time windows are identified within the statistical data. The time windows overlap and begin at a most recent time period, extending back to different previous time periods within the statistical data.

At 606, a curve is fit to the statistical data within each of the two or more time windows. In some embodiments, the curve comprises a line fit to the statistical data within the time window using a linear regression algorithm.

At 608, a trend score is calculated for the digital asset based on information related to the curves fit to the statistical data within the two or more time windows. In some embodiments, a raw trend score comprises calculating a weighted sum of terms corresponding to each of the two or more time windows, each term for a particular time window is calculated by multiplying a coefficient of determination by a slope of the line fit to the statistical data within the particular time window divided by a standard deviation of the statistical data within the particular time window.

At 610, optionally, the raw trend score is normalized or quantized. In some embodiments, the raw trend score can be normalized to fit within a pre-defined range (e.g., [0.0, 1.0]) to be utilized by other algorithms. Alternatively, the raw trend score can be quantized for easier consumption of a human audience by visualization.

At 612, the digital asset is promoted within a content distribution system based on the trend score. In some embodiments, the content distribution system can generate a visual representation of a list of digital assets based on a ranking. The trend score can be used to promote the digital asset by adjusting the ranking for the digital asset, thereby increasing the visibility of the digital asset within the list.

Algorithm for Identifying Recommended Content

While identifying trending content is useful, the promoted content based on trends over all users is not tailored to the potential likes or interests of a particular user. One method for identifying digital assets that may be of interest to a particular user is to recommend digital assets downloaded and/or used by other similar users to the user. This type of algorithm can be generally referred to as collaborative filtering. In a naïve implementation of these algorithms, a service can determine what digital assets have been downloaded by similar users that have not been downloaded by a particular user. These digital assets are then recommended to the user. However, this naïve implementation does not account for the usage of those digital assets by the various users. Simply downloading a digital asset one time is not a great indicator of a user's satisfaction with that digital asset. For example, one user could download a game, play it once or twice and then ignore that game on their device because the game was of little interest to the user. In contrast, another user could download the same game and spend hours playing the game, ignoring other games that the user has downloaded because of how much they enjoy that particular game. While the download history of both users would show that the users have downloaded the same game, it is obvious from their usage history that the two users received very different levels of enjoyment or satisfaction from the game. Thus, while a conventional collaborative filtering algorithm might merely compare the download histories of the two users, a better implementation may account for both download history as well as the resulting behavior of the users with respect to interaction with the various digital assets that have been downloaded to a device.

Of course, any collaborative filtering algorithm, alternatively referred to as a recommendation algorithm, implemented by the content distribution system 200 is limited by the availability of information to the content distribution system 200. A download history is typically readily available because the client device 240 requests the digital asset from the server device 210 in order to retrieve the digital asset from the database 230. Usage data related to the interaction of a user with a particular digital asset, once installed on the client device 240, is less readily available at the server device 210. In some embodiments, the client device 240 can be configured to collect usage data at the client device 240 and transmit the usage data to the server device 210. The server device 210 can then store the usage data in a database to be later used by a recommendation algorithm. In other embodiments, the digital assets, especially in the case of games, can include an interactive function that requires the client device 240 to interact with the server device 210. For example, the game may require a user to sign-in with a user account, where credentials of the user account are sent from the client device 240 to the server device 210 to verify the credentials provided by the user. In such cases, the act of verifying the user's credentials can be logged by the server device 210 as a "check-in" associated with that digital asset. The server device 210 can collect all history of user check-ins, which provides insight into the usage history of a user with that particular digital asset.

In yet other embodiments, the client device 240 can log additional data related to the usage history of a user with a particular digital asset and report such usage data to the server device 210. For example, the client device 240 can monitor how long a particular application or game is active on a client device and send that usage data to the server device 210. As another example, the client device 240 could monitor how many times a particular song is played in a music playing application and report a playing frequency of each song in a music catalog stored on a client device 240 to the server device 210. It will be appreciated that such detailed usage data can implicate privacy concerns and, in some instances, care may be needed when collecting such usage data. For example, collecting detailed usage data may require a user to opt-in to such data collection in order to be provided more personal recommendations for new music based on their listening history. In other embodiments, the provider of the content distribution system 200 can choose to limit the scope and/or amount of usage data collected to protect the privacy of the users. For example, a number of songs played on a music playing application can be collected, but the identity of the songs played is not collected. As another example, the number of times an application or game is launched is collected (e.g., via check-in notifications sent to the server device 210), but the total time spent within the application or game is not collected.

FIG. 7 illustrates a chart 700 showing the digital assets installed on a plurality of client devices 240, in accordance with some embodiments. The chart 700 can be included in a table of the database 230. As depicted in FIG. 7, the chart 700 includes a row for each user of N users. For each user, the chart 700 indicates whether that user has installed each of M digital assets of a client device 240 of that particular user. It will be appreciated that, as used herein, a user can refer to a particular user account associated with one or more client devices. The chart 700, therefore, aggregates the installation information of digital assets installed across all client devices 240 associated with the particular user. This is particularly relevant when digital assets are stored in the cloud and can be synced or downloaded to multiple different client devices 240 controlled, owned, or operated by the user. In other embodiments, each user can refer to a particular client device 240 such that the same user account associated with multiple client devices can be included in the chart 700 as multiple distinct "users". In such embodiments, different recommendations may be made to a particular user based on the current device being used by the particular user.

In some embodiments, the server device 210 can determine which users in the chart 700 are similar to a particular user using the installation data included in the chart 700. Notably, each user is associated with an M-element vector of ones or zeros, where a one indicates that a particular digital asset is installed on a client device 240 and a zero indicates that the particular digital asset is not installed on the client device 240. So, the M-element vector for a particular user includes a '1' at a location in the vector corresponding to each digital asset installed on one or more client devices 240 associated with the user.

In some embodiments, the DC engine 224 or some other process running on the server device 210 can implement a recommendation algorithm to identify digital assets to recommend to a user based on the digital assets installed by similar users. The recommendation algorithm first ranks all users as similar to a particular user by taking a dot product of the M-element vector for a particular user with the M-element vectors of all other users in the chart 700. It will be appreciated that the dot product operation results in an integer that has a value that indicates how many digital assets installed on client devices 240 associated with the particular user are also installed on client devices 240 for the other user. Thus, ranking the other users by the value of the dot product operation indicates which users are most similar to the particular user. However, the installation data contained in chart 700 is only part of the information that is used to rank users' similarity.

FIG. 8 illustrates a chart 800 showing the usage information related to digital assets installed on a plurality of client devices 240, in accordance with some embodiments. The chart 800 can be included in a table of the database 230. As depicted in FIG. 8, the chart 800 includes a row for each user of the N users. For each user, the chart 800 indicates a usage frequency for each of the M digital assets of a client device 240 of that particular user. The usage frequency or, more generally, usage data provides a more detailed understanding of a particular user's behavior as related to the digital assets installed on one or more client devices 240.

In some embodiments, the recommendation algorithm ranks all users as similar to a particular user by taking a dot product of the M-element vector in chart 800 for a particular user with the M-element vectors of all other users in the chart 800. As depicted in FIG. 8, in some embodiments, the usage data can comprise an integer value that indicates the number of check-ins or number of times a digital asset is accessed within a particular window. In some embodiments, the window is a 30-day window. In other embodiments, the window is a 6-month window. The size of the window can be selected in order to ensure that the usage data is relevant. In other words, the usage data should reflect recent activity and not stale activity related to digital assets from years in the past. In yet other embodiments, a window is not used and the usage data reflects all usage information since the user began using one or more client devices 240.

Although the usage data in chart 800 can be utilized as a replacement for the less detailed installation data in chart 700, in some embodiments, the recommendation algorithm can actually combine the information from both chart 700 and chart 800 to generate a similarity score. In some embodiments, the similarity score is calculated as a weighted sum of two dot product operations, as shown in the following equation:

$$S_{user_i} = \omega_{install}(I_{user_i} \cdot I_{user_j}) + \omega_{usage}(U_{user_i} \cdot U_{user_j}) \quad \text{(Eq. 9)}$$

As shown in Equation 9, a similarity score $S_{user_i}$ for an $i^{th}$ user is calculated as a sum of a dot product of the M-element vector $I_{user_i}$ of the installation data in chart 700 for the $i^{th}$ user with the M-element vector $I_{user_j}$ for a target user j, multiplied by a weight $\omega_{install}$ install with the dot product of the M-element vector $U_{user_i}$ of the usage data in chart 800 for the $i^{th}$ user with the M-element vector $U_{user_j}$ for the target user multiplied by a weight $\omega_{usage}$. It will be appreciated that the weights can be used to normalize the dot product for the installation data with the dot product for the usage data due to the relative disparity between the two raw values when the usage data is stored as integers related to, e.g., number of check-ins. Alternatively, the dot products can be normalized, such as by normalizing the usage data stored in chart 800 prior to calculating the dot product.

In some embodiments, the weights $\omega_{usage}$ and $\omega_{usage}$ can be set dynamically based on the installation data and/or the usage data for the target user. For example, where a particular user has a small number of installed digital assets, the weight $\omega_{usage}$ can be increased relative to the weight $\omega_{install}$ because the similarity score should be skewed to reflect those other users that more closely match the usage data for the small number of applications. In contrast, where a particular user has a large number of installed digital assets, the weight $\omega_{usage}$ can be decreased relative to the weight $\omega_{install}$ install because the similarity score should be skewed to reflect those other users that more closely match the installation data for the large number of digital assets rather than the particular usage history of each of those large number of digital assets.

In some embodiments, the recommendation algorithm implements a collaborative filtering (CF) model that, for a target user j, calculates a similarity score for each of i additional users. The i additional users are then ranked by similarity score and a portion of the i users most similar to user j are selected as similar users. Then, for each of the digital assets not installed by user j (e.g., those digital assets corresponding to a zero value for the entry for user j in chart 700), a recommendation score is calculated based on the installation data and/or the usage data for that digital asset included in the M-element vectors of each of the similar users. In one embodiment, the recommendation score can be simply a sum of the corresponding value in M-element vector in the installation data for each of the similar users. In other words, for a particular digital asset not installed on a client device 240 of the particular user j, the recommendation score for that digital asset can be the total number of similar users that have installed that particular digital asset.

In other embodiments, the recommendation score can be a sum of the corresponding value in M-element vector in the usage data for each of the similar users. In other words, the recommendation score can reflect how much similar users utilize or interact with the particular digital asset on a corresponding client device 240 rather than simply a count of how many similar users have installed the digital asset on the client device 240. In yet other embodiments, the recommendation score can reflect a combination of the installation data and the usage data. For example, a base recommendation score can be calculated based on how many similar users have installed the digital asset on a client device 240. However, the base recommendation score can be adjusted according to the usage data of the similar users. For example, a scale value can be calculated according to the sum of usage frequency values for the digital asset over the similar users, and then the base recommendation score can be multiplied by the scale value to promote certain digital assets more frequently used by similar users over other digital assets less frequently used by similar users.

In some embodiments, the recommendation algorithm described above is particularly adapted to recommending games to a user. Games, e.g., applications with an entertainment and interactive aspect, are commonly designed to facilitate the easy collection of usage data. For example, games may incorporate a social aspect that requires the game to send a request to a server to check which of a user's friends are online. These requests can easily be converted into usage data at the server without requiring any particular modification to the code in the game or building in any new features that require increasing network traffic to incorporate the collection of usage data. Consequently, the recommendation algorithm can be utilized to provide a list of recommended games to a user within a digital app store or the like.

Figure 9:
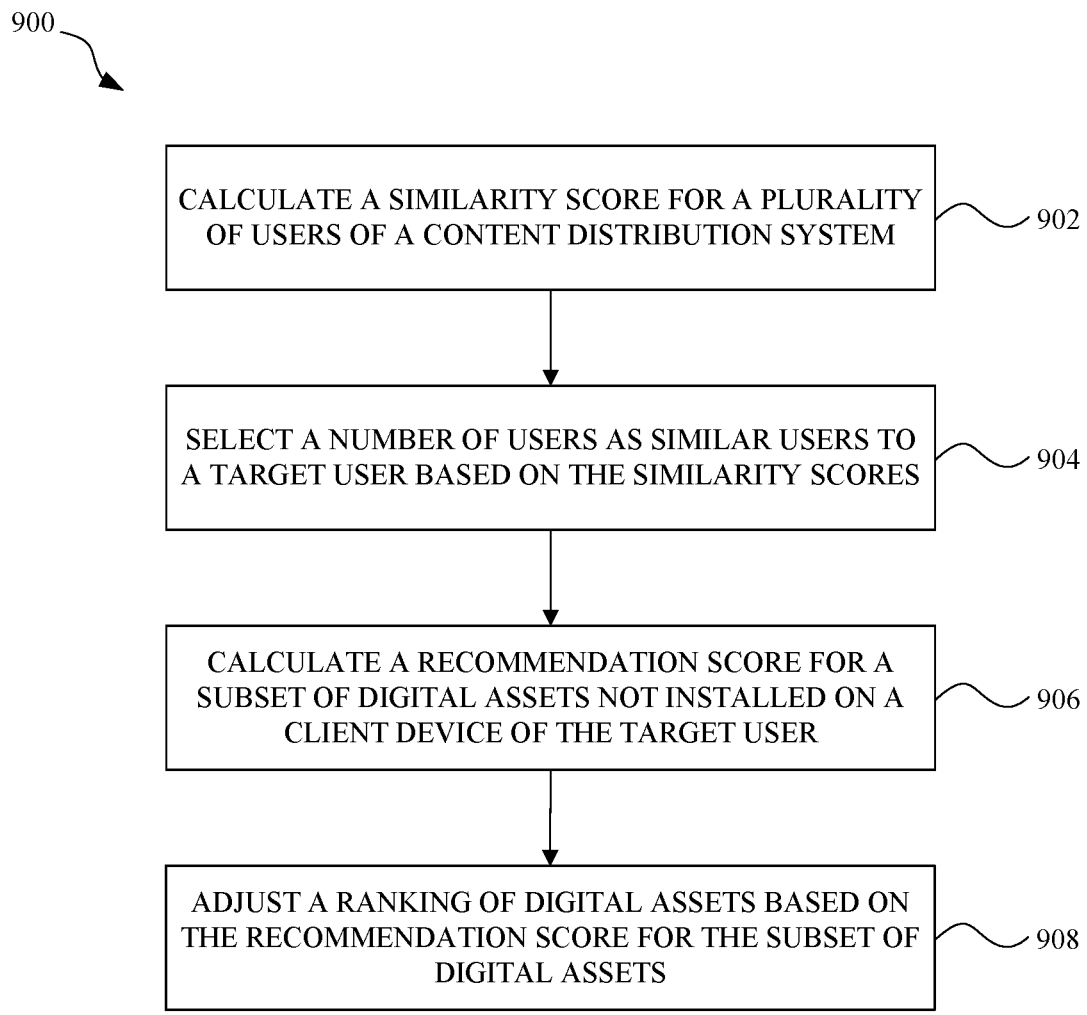
FIG. 9 illustrates a method for identifying recommended content, in accordance with some embodiments.

FIG. 9 illustrates a method 900 for identifying recommended content, in accordance with some embodiments. The method 900 can be performed by hardware, software, or some combination of hardware or software. In some embodiments, the method 900 can be implemented, at least in part, by the DC engine 224 of the content distribution system 200 when populating lists for display to a user in a client application 254 of a client device 240.

At 902, a similarity score is calculated for a plurality of users of a content distribution system. The similarity score compares each of the users to a target user of the content distribution system. In some embodiments, the target user is a user associated with a client device 240 making a request to the content distribution system to make recommendations of digital assets to the target user. In some embodiments, the similarity score is based on a combination of a dot product of installation data and a dot product of usage data.

At 904, a number of users are selected as similar users based on the similarity score. In some embodiments, a pre-defined number of users corresponding to users having the largest similarity scores are selected as similar users to the target user. For example, the top 5,000 users according to the calculated similarity scores are selected as similar users.

At 906, a recommendation score is calculated for each digital asset of a subset of digital assets not installed on a client device of the target user. In some embodiments, the recommendation score comprises a sum of the number of similar users that have installed that particular digital asset on a client device associated with the similar user.

At 908, a ranking of digital assets is adjusted based on the recommendation score for the subset of digital assets. In some embodiments, the recommendation scores are used to promote digital assets within a ranking based on some other criteria, such as a ranking based on total cumulative number of downloads of the various digital assets. For example, digital assets can be promoted up the ranking based on the recommendation score by advancing the digital asset up the ranking based on the number of similar users that have installed that digital asset. Alternatively, the recommendation score can be used to adjust a ranking of digital assets ranked according to a trend score.

It will be appreciated that the ranking of digital assets based on trend score can be adjusted by promoting the subset of digital assets within the ranking being recommended to a target user. The ranking based on trend score is user agnostic, while the recommendation scores are tailored to a target user. Thus, the list of trending content could be tailored to a particular user by promoting that trending content that is also installed on client devices of similar users to the target user. In some embodiments, a particular spot in the ranking of a digital asset is adjusted based on the magnitude of the recommendation score. For example, a digital asset with a low recommendation score will be promoted less than a digital asset with a high recommendation score.

In other embodiments, the method 900 omits step 908 in favor of generating a separate ranking based only on the recommendation scores for the subset of digital assets not installed on the client device of the target user. In other words, a list of recommended content can be provided to a user by ranking digital assets based on the recommendation scores calculated for the subset of digital assets. This list can be provided to the target user separately from the list related to the trending content.

Algorithm for Identifying Breakout Content

As set forth above, the content distribution system 200 includes means for promoting trending content unrelated to any particular user and recommended content associated with similar users to a particular user. However, in some cases, certain content should be promoted when the content is neither trending nor recommended based on similarity of a particular user to other users. In this case, the particular content being promoted can be referred to as breakout content as identified by certain trendsetters.

More specifically, certain users are typically very good at identifying popular content before said content goes viral or is widely downloaded. Sometimes these users can be referred to as early-adopters or, in the case of music, trendsetters. These users might have a knack for identifying songs or other content before those songs reach a mainstream audience. The reasons for this can be varied, including these users being well connected to groups of individuals that participate in discovering local bands or being particularly adept at browsing recently released material and identifying content that is likely to catch on with a mainstream user base.

Figure 10:
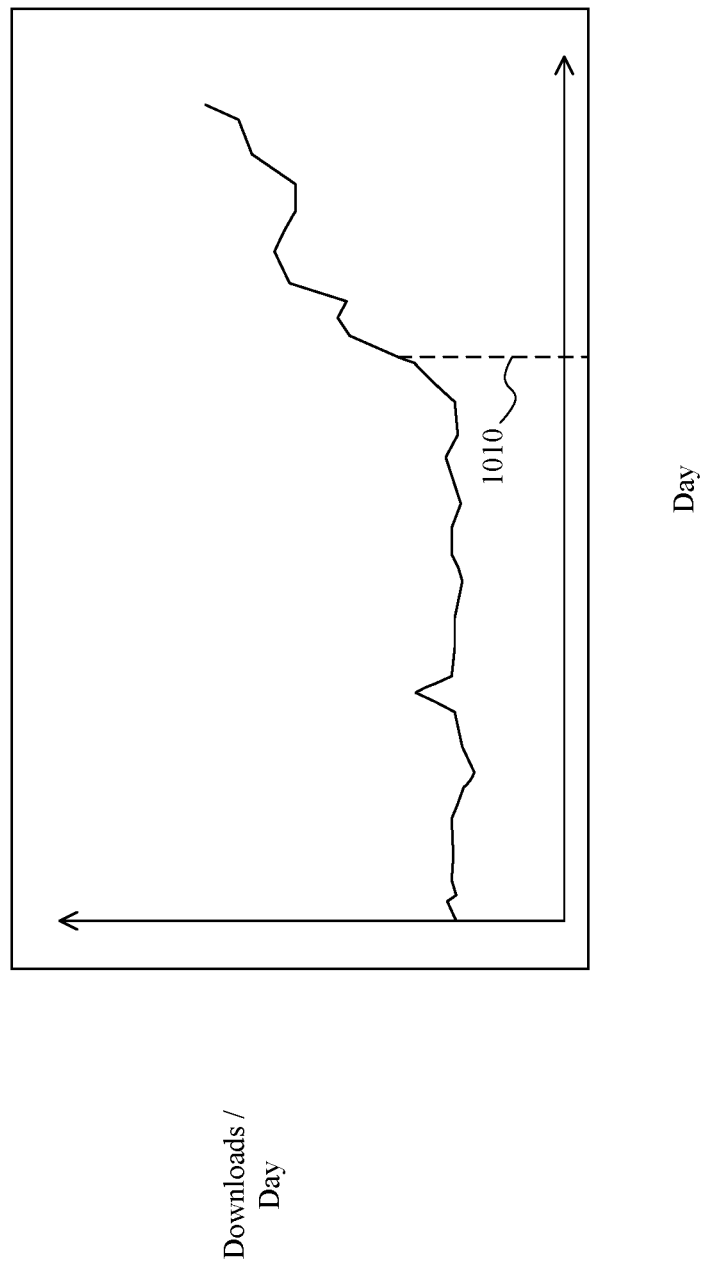
FIG. 10 illustrates a chart of downloads for a particular digital asset, in accordance to some embodiments.

FIG. 10 illustrates a chart of downloads for a particular digital asset, in accordance to some embodiments. It is obvious from viewing the chart that the number of downloads of the digital asset prior to a certain date 1010 is relatively flat. However, after the certain date 1010, referred to as a breakout date, the long term trend is that the number of downloads per day generally increases as the digital asset gains popularity and is sought by a more widespread audience. Given any particular digital asset, the historical download history can be analyzed to identify a breakout date for that digital asset; however, in certain cases, a digital asset may have no breakout date. Examples of the cases where there may be no breakout date are when a curve showing the number of downloads per day for a digital asset is flat or increases substantially linearly over time. However, many digital assets do exhibit characteristics of having a breakout date where a baseline number of downloads per day prior to the breakout date is significantly less than an average number of downloads per day after the breakout date.

A breakout date can be identified utilizing one of a variety of analytical methods. In some embodiments, the historical download data is analyzed to determine on which date or range of dates the average number of downloads exceeds a specified level of daily downloads. For example, a baseline level of 1,000 downloads per day can be specified as an indication of a breakout date. A window of particular size can be specified, such as a 7-day window, a 10-day window, a 30-day window, or so forth. Then, the historical download data can be analyzed within a moving window across a full date range of the historical download data for the digital asset to compare an average number of daily downloads within the window to the baseline level of, e.g., 1,000 downloads per day. In some embodiments, the average number of daily downloads is calculated within a 10-day window, the average number of daily downloads being compared to the 1,000 download threshold to determine if the 10-day window is associated with a breakout date. If the average number of daily downloads exceeds the threshold value (e.g., the baseline value), then the 10-day window is associated with a breakout date, and the breakout date is identified within the 10-day window, such as selecting the earliest date within the 10-day window, the day within the 10-day window having the highest number of downloads, or the latest date within the 10-day window, for example. In some embodiments, there may be a caveat to identifying the date as a breakout date, where, for example, the average number of daily downloads within a later 10-day window falls below the threshold value (e.g., below the baseline). In such cases, the originally identified breakout date might have been a false positive caused by a spike in downloads due to other factors such as a promotion or attempt to game the breakout algorithm.

In other embodiments, other analytical techniques can be employed to identify the breakout date for a particular digital asset. The analytical techniques can combine any of the following factors: (1) cumulative number of downloads; (2) exponentially weighted moving average (EWMA) using a short time range (e.g., measure of recent activity); (3) EWMA using a long time range (e.g., measure of historical activity); (4) cumulative sum of downloads within a given time window; (5) simple moving average of downloads; (6) a count of instances where the number of downloads in a given day are statistically significantly higher than a baseline value; or (7) a normalized number of downloads (to remove scale).

In some embodiments, the above factors are utilized to determine a moving average convergence/divergence (MACD) metric that allows for dynamic comparison of the historical download data over time and determines whether or not a particular number of downloads is statistically higher than expected. More specifically, a short time frame EWMA and a long time frame EWMA are calculated for the historical download data. A MACD series signal is then determined, over time, by calculating a difference between the short time frame EWMA and the long time frame EWMA. Then, a third signal comprising an EWMA of the MACD series signal is determined. The time frame of the EWMA for the third signal can be even shorter than the short time frame EWMA. In some embodiments, the time frames selected can be 14 days, 30 days, and 10 days for the short time frame EWMA, the long time frame EWMA, and the EWMA for the third signal, respectively. A peak in the third signal above a threshold value, which represents a sustained number of days where the short term EWMA exceeded the long term EWMA by a threshold value, can be utilized to identify the breakout date.

Once breakout dates are identified for digital assets, a breakout algorithm can be utilized to recommend certain digital assets to users based on a breakout score calculated for the digital assets. In some embodiments, the breakout algorithm comprises identifying a set of digital assets having breakout dates. Then, a set of trendsetters are identified that downloaded or installed more than a threshold number of those digital assets prior to the corresponding breakout date. A different set of trendsetters can be identified for each category of digital assets of a plurality of different categories of digital assets. For example, a first group of trendsetters can be identified for games and a different set of trendsetters can be identified for songs or audio files. As a different example, a first set of trendsetters can be identified for songs within a pop genre and a second set of trendsetters can be identified for songs within an electronic genre. Once a set of trendsetters is identified for a particular category of digital assets, a breakout score can be calculated for each digital asset downloaded or installed by at least one of the identified set of trendsetters. The digital assets downloaded or installed by at least one trendsetter are then ranked based on the breakout score, and the digital assets associated with the top breakout scores can be promoted or otherwise recommended to a user.

In some embodiments, a set of all digital assets within a particular category are filtered to exclude obscure digital assets. Obscurity can be defined as any digital assets where the cumulative number of downloads over the life of the digital asset is below a threshold value (e.g., less than 5,000 downloads) or, alternatively, where the average number of downloads within a given time window never exceeds a threshold value (e.g., less than 10 downloads per day/week). Such digital assets can be discarded as not identifiable as breakout content due to the relative obscurity of the digital asset.

It will be appreciated that other digital assets, even if not obscure, do not have an identifiable breakout date. This can be the case where the total number of downloads is flat or decreases over time. A breakout date might also not be identifiable where the average number of downloads per day for a given asset increases relatively linearly over time at a pace that does not trigger any specific analytical metric as discussed above. The set of digital assets within a particular category is also filtered to exclude digital assets without identifiable breakout dates.

Finally, the set of digital assets can also be filtered to exclude digital assets that were popular prior to the identified breakout date. In other words, a digital asset can be so widely adopted prior to the identified breakout date that the digital asset cannot be identified as breakout content for the purposes of establishing a list of trendsetters. For example, when the cumulative number of downloads of a digital asset exceeds a threshold value (e.g., 100,000 downloads) prior to the breakout date, then the digital asset can be discarded as not identifiable as breakout content due to the relative popularity of the digital asset. This can be common where an artist or group is relatively famous already prior to the release of a new song. In such cases, established fans of the artist or group can immediately download the song such that there is no identifiable breakout date for the song. Instead, breakout content exhibits a niche area within a particular category of digital assets where the total cumulative number of downloads of the digital asset prior to the identified breakout date is less than a threshold value and the average number of daily downloads after the breakout date is statistically significantly higher than pre-breakout date levels.

Once a set of digital assets within a particular category has been identified as content having an established and identifiable breakout date, a set of trendsetters can be identified. In some embodiments, a trendsetter is defined as any user that has downloaded/installed at least a threshold number of digital assets prior to a corresponding breakout date for that particular digital asset. In other words, for each digital asset in the set of digital assets where a breakout date has been identified, a list of early adopters that downloaded the digital asset prior to a corresponding breakout date for the digital asset are identified. The number of times a particular user is included in the list of early adopters across the set of digital assets having a breakout date can be counted and compared with a threshold value. If the number exceeds the threshold value, then that user can be identified as a trendsetter for that particular category of digital assets. For example, if any user is identified as an early adopter of 3 or more digital assets within a particular category of digital assets, then that user can be identified as a trendsetter. The threshold number can be adjusted to increase or reduce the desired number of trendsetters identified within a particular category of digital assets.

Alternatively, in other embodiments, each user can be associated with a count indicating how many times the user was an early adopter of breakout content. All early adopters can then be ranked based on the count, and a pre-defined number of early adopters having the highest counts can be identified as trendsetters.

FIG. 11 illustrates a list of trendsetters, in accordance with some embodiments. As depicted in FIG. 11, a number L of trendsetters are identified using the techniques described above. Each of these trendsetters is associated with a list of digital assets that that particular trendsetter has installed or downloaded. In the case of songs or audio files, the list of digital assets can include a number of song identifiers or audio file identifiers for songs or audio files installed on a client device 240 of the trendsetter. Again, the list of digital assets can be filtered to include only those digital assets within a particular category. For example, if a particular user is identified as a trendsetter in a pop music genre, then the list of digital assets installed on a client device 240 of that user can be filtered to exclude any digital assets that do not fall within the pop music genre. The list of digital assets can also be filtered to include only those digital assets having a cumulative number of daily downloads below a specified threshold value or, alternatively, a EWMA of the historical download data that does not exceed a threshold value. The breakout algorithm is interested in recommending obscure digital assets that are likely to breakout based on the downloading or installation of the digital asset by one or more trendsetters identified for a particular category of digital assets.

The filtered list of digital assets associated with the trendsetters is then analyzed to rank the digital assets within the filtered list. In some embodiments, a linear regression analysis is performed on the historical download data for each digital asset in the filtered list of digital assets. The linear regression analysis fits a line to the data, the slope of the line providing a measure of the rate of increase in the average number of daily downloads of the digital asset over a specified time frame. For example, the linear regression analysis can be performed on the last 30 days of historical download data to determine whether there is any identifiable increase in the average number of daily downloads of the digital asset over the last 30 days. The digital assets with the highest average number of daily downloads, combined with a rate of change of the line fit to the historical download data within the specified window, while also being under the threshold daily download limit, are ranked highest in terms of relative potential to be breakout content. In some embodiments, this statistical analysis can be performed to calculate a breakout score based on a weighted combination of an average number of daily downloads metric and a slope metric corresponding to the slope of the line fit to the historical download data within the specified window.

These techniques can be applied to identify trendsetters within a particular category or genre of digital assets and, subsequently, identify content that is most likely to break out and become popular or widely adopted/downloaded prior to the break out event occurring. These digital assets can then be promoted over other digital assets as breakout content.

Figure 12:
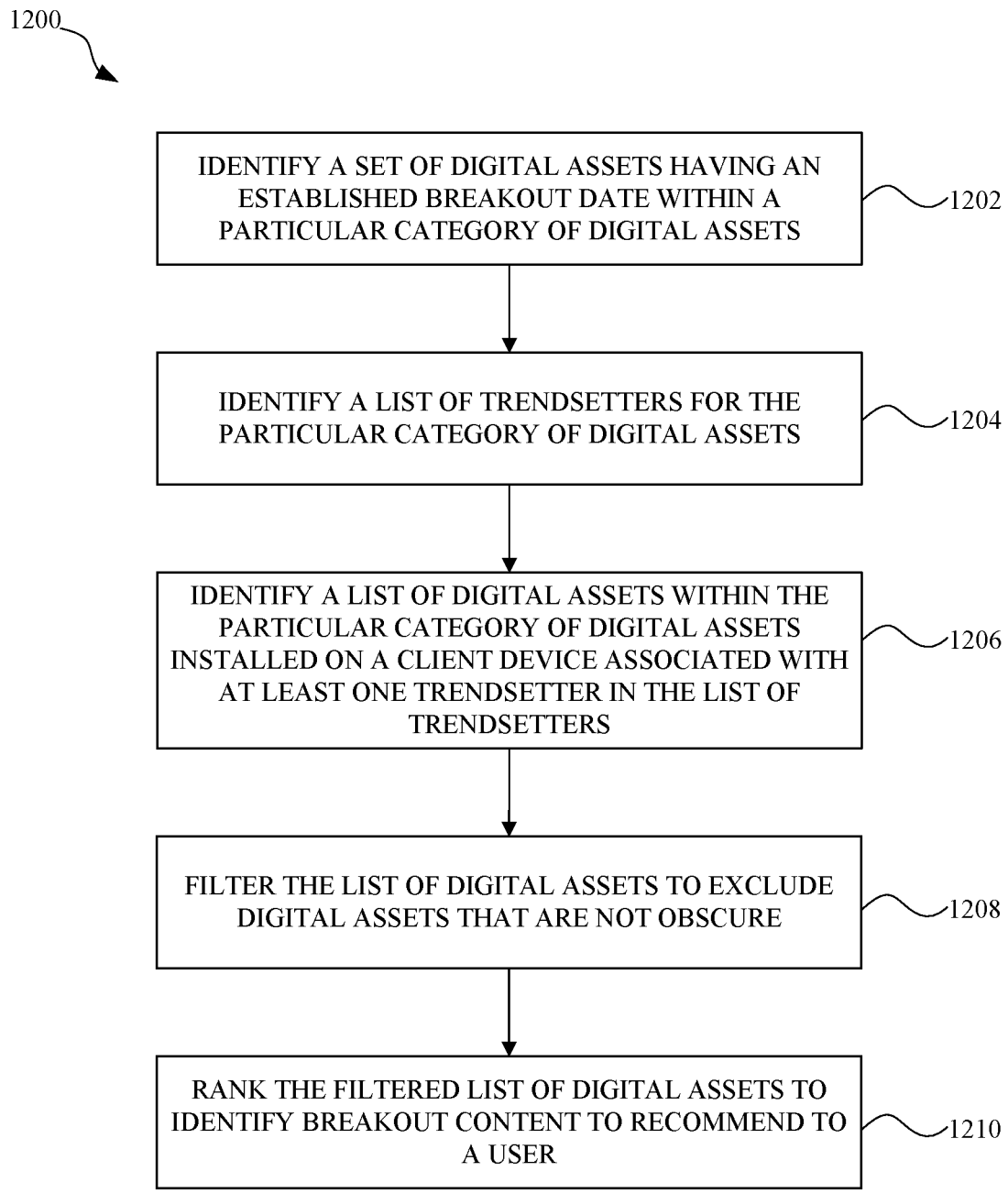
FIG. 12 illustrates a method for identifying breakout content, in accordance with some embodiments.

FIG. 12 illustrates a method 1200 for identifying breakout content, in accordance with some embodiments. The method 1200 can be performed by hardware, software, or some combination of hardware or software. In some embodiments, the method 1200 can be implemented, at least in part, by the DC engine 224 of the content distribution system 200 when populating lists for display to a user in a client application 254 of a client device 240.

At 1202, a set of digital assets having an established breakout date are identified within a particular category of digital assets. In some embodiments, digital assets within a particular category released within a particular time frame (e.g., released within the last 12 or 24 months) are selected, and historical download data for these recently released digital assets are analyzed to determine which recently released digital assets have an established breakout date. The breakout date can be identified by a variety of techniques. In some embodiments, a MACD metric can be utilized to determine whether there is a breakout date for a given digital asset over a particular time frame.

At 1204, a list of trendsetters is identified for the particular category of digital assets. In some embodiments, a set of digital assets with established breakout dates are utilized to identify the list of trendsetters. A count is established for each user that downloaded at least one digital asset prior to the corresponding breakout date for that digital asset. The users can then be sorted by count, and a number of users corresponding to the top of the sorted list are identified as trendsetters.

At 1206, a list of digital assets within a particular category that are installed on a client device associated with at least one of the identified trendsetters is identified. Once the trendsetters are identified, then all of the digital assets downloaded by those trendsetters are identified as potential breakout content. Again, a trendsetter can be established within a particular category or genre of digital assets and, therefore, the list of digital assets downloaded by those trendsetters can be limited to only those digital assets within that particular category or genre of digital content for which that user is identified as a trendsetter.

At 1208, the list of digital assets is filtered to exclude digital assets that are not obscure. Even though a trendsetter has downloaded some particular digital assets within a category or genre, some of those digital assets might already be well-known and are not suitable for being identified as breakout content. In some embodiments, the list of digital assets installed on a trendsetter's client device is filtered to remove digital assets having a cumulative number of downloads that exceeds a threshold value (e.g., 5,000 downloads).

At 12010, the filtered list of digital assets is ranked to identify breakout content to recommend to a user. The filtered list can be ranked and then a pre-defined number of digital assets corresponding to the highest breakout score can be selected as breakout content to recommend to a user. In some embodiments, the filtered list of digital assets is ranked based on how many trendsetters have downloaded that particular digital asset. For example, a digital asset that was downloaded by five trendsetters is ranked higher than a digital asset that was downloaded by merely one or two trendsetters. The breakout score can include a count of how many different trendsetters downloaded a particular digital asset. In some embodiments, the breakout score can also incorporate other statistical metrics, in addition to or in lieu of the count, such as a metric that indicates a level of a cumulative number of downloads of a digital asset or a metric of a trend of increasing average number of daily downloads over a particular time frame.

It will be appreciated that each of the algorithms discussed above can be implemented alone or in combination with other algorithms. For example, a list can be compiled separately based on the trend score, the recommendation score, or the breakout score. Alternatively, a composite list can be compiled that includes aspects of the trend score, the recommendation score, and the breakout score. Furthermore, the trend score, the recommendation score, or the breakout score can be utilized to augment a list created based on some other metric such as cumulative number of downloads, thereby promoting trending content or recommended content within the list compiled purely on popularity of the digital assets.

Figure 13:
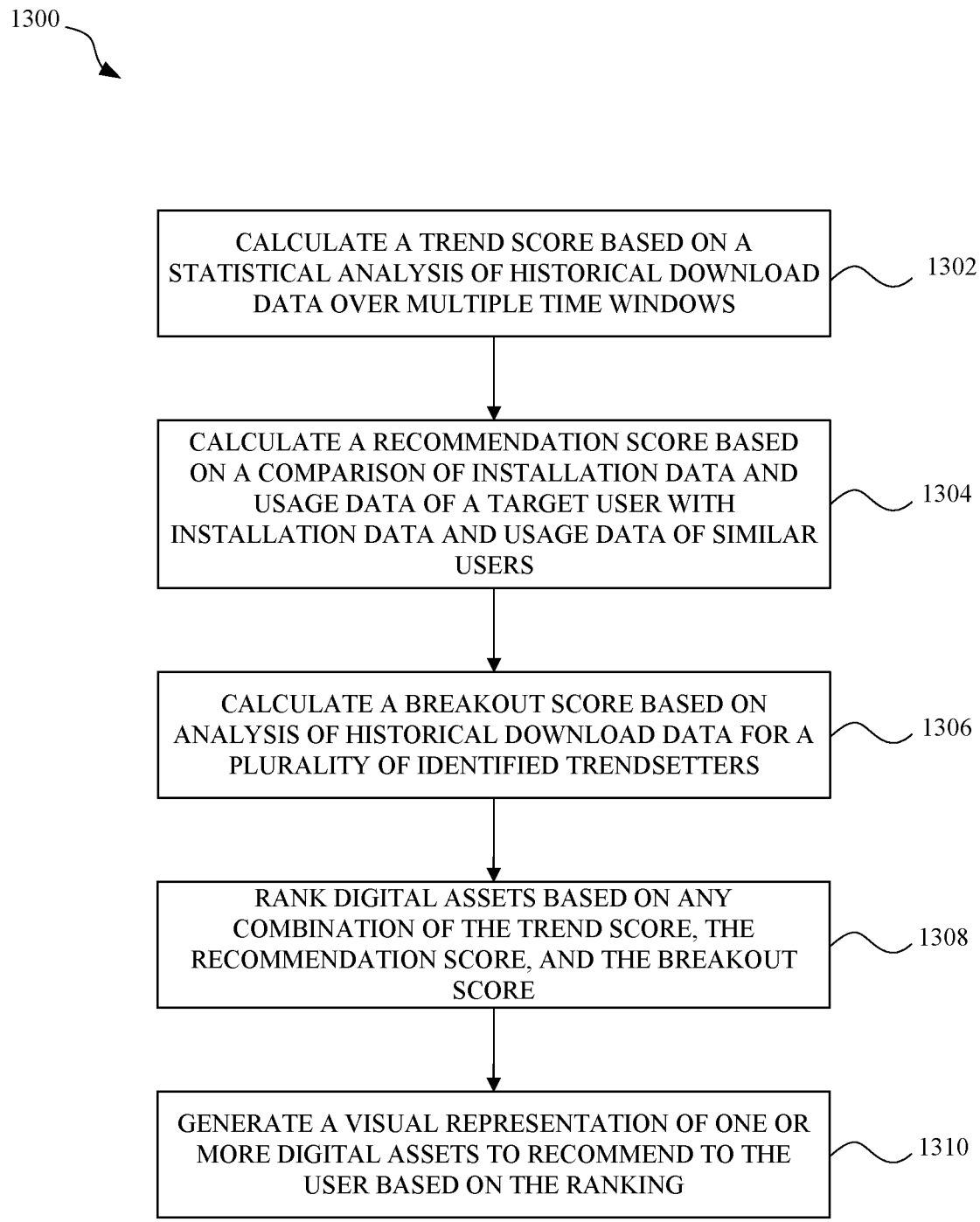
FIG. 13 illustrates a method for identifying breakout content, in accordance with some embodiments.

FIG. 13 illustrates a method 1300 for identifying breakout content, in accordance with some embodiments. The method 1300 can be performed by hardware, software, or some combination of hardware or software. In some embodiments, the method 1300 can be implemented, at least in part, by the DC engine 224 of the content distribution system 200 when populating lists for display to a user in a client application 254 of a client device 240.

At 1302, a trend score is calculated based on a statistical analysis of historical download data over multiple time windows. In some embodiments, the trend score is calculated based on a statistical analysis of two or more lines fit to different subsets of historical download data.

At 1304, a recommendation score is calculated based on a comparison of installation data and usage data of a target user with installation data and usage data of similar users. In some embodiments, the recommendation score is calculated based on an analysis of which digital assets are downloaded by similar users, where the similar users are identified based on a comparison of a weighted combination of download data and usage data for various users with a target user.

At 1306, a breakout score is calculated based on analysis of historical download data for a plurality of identified trendsetters. In some embodiments, the breakout score is calculated based on an analysis of the digital assets installed by various trendsetters identified for a particular category or genre of digital assets.

At 1308, digital assets are ranked based on any combination of the trend score, the recommendation score, and the breakout score. It will be appreciated that, in some embodiments, the ranking can incorporate any one of the trend score, the recommendation score, or the breakout score alone to generate a ranked list of trending content, recommended content, or breakout content, respectively. However, in other embodiments, the ranking incorporates at least two of the trend score, the recommendation score, or the breakout score.

At 1310, a visual representation is generated of one or more digital assets to recommend to the user based on the ranking. The visual representation can include any representation of a list of digital assets displayed on a display of a client device. For example, the visual representation can be a HTML document, an XML document, JSON data, or the like configured to include elements that, when interpreted by a browser application or a client application, cause the client device to generate pixel data for display that includes some type of visual interpretation of the digital asset. For example, the visual interpretation of the digital asset can include an icon, an image, a text string represented with a font, and the like.

Figure 14:
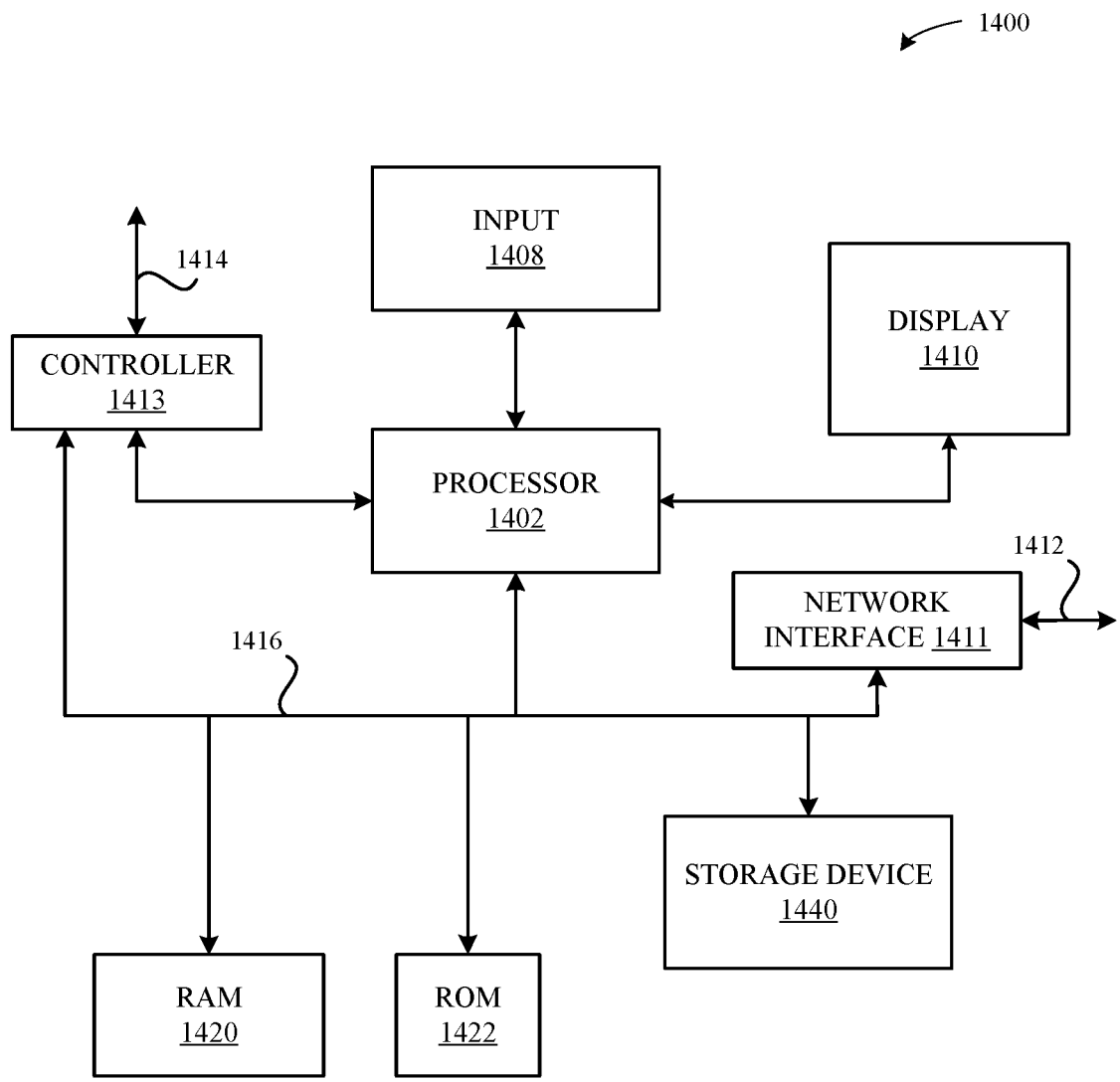
FIG. 14 illustrates a detailed view of an exemplary computing device that can be used to implement the various apparatus and/or methods described herein, in accordance with some embodiments.

FIG. 14 illustrates a detailed view of an exemplary computing device 1400 that can be used to implement the various apparatus and/or methods described herein, in accordance with some embodiments. In particular, the detailed view illustrates various components that can be included in the computing devices illustrated in FIGS. 1 and 2 and/or otherwise described herein. For example, one or more of the server devices(s) 110, client device(s) 120, server device 210, client device 240, or any other device including any network devices and/or consumer electronics can include the components of computing device 1400.

As shown in FIG. 14, the computing device 1400 can include a processor 1402 that represents a microprocessor or controller for controlling the overall operation of computing device 1400. The computing device 1400 can also include a user input device 1408 that allows a user of the computing device 1400 to interact with the computing device 1400. For example, the user input device 1408 can take a variety of forms, such as a button, keypad, dial, touch screen, audio input interface, visual/image capture input interface, input in the form of sensor data, etc. Still further, the computing device 1400 can include a display 1410 (screen display) that can be controlled by the processor 1402 to present visual information to the user. A data bus 1416 can facilitate data transfer between at least a storage device 1440, the processor 1402, and a controller 1413. The controller 1413 can be used to interface with and control different equipment through an equipment control bus 1414. The computing device 1400 can also include a network/bus interface 1411 that couples to a data link 1412. In the case of a wireless connection, the network/bus interface 1411 can include a wireless transceiver.

The computing device 1400 also include a storage device 1440, which can comprise a single disk or a plurality of disks (e.g., hard drives), and includes a storage management module that manages one or more partitions within the storage device 1440. In some embodiments, storage device 1440 can include flash memory, semiconductor (solid state) memory or the like. The computing device 1400 can also include a Random Access Memory (RAM) 1420 and a Read-Only Memory (ROM) 1422. The ROM 1422 can store programs, utilities or processes to be executed in a non-volatile manner. The RAM 1420 can provide volatile data storage, and stores instructions related to the operation of the computing device 1400.

As described above, one aspect of the present technology is the gathering and use of data available from various sources to improve the delivery to users of recommended content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to more efficiently browse through catalogs of digital content that is made available through a content distribution system. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of data collection services, the present technology can be configured to allow users to select to "opt in" or "opt out" of participation in the collection of personal information data during registration for services or anytime thereafter. In another example, users can select not to provide usage data related to digital assets to the content distribution system. In yet another example, users can select to limit the type of usage data or entirely prohibit the collection of a usage data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, recommended content can be selected and delivered to users based on non-personal information data or a bare minimum amount of personal information, such as the content being requested by the device associated with a user, other non-personal information available to the content distribution system, or publicly available information.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for identifying digital assets to recommend to a user, the method comprising, at a server device:
    identifying a set of digital assets within a particular category of digital assets, each digital asset in the set of digital assets having a corresponding breakout date established for the digital asset;
    identifying one or more trendsetters associated with the particular category of digital assets;
    generating a list of digital assets within the particular category of digital assets downloaded by at least one trendsetter in the one or more trendsetters;
    filtering the list of digital assets downloaded by the at least one trendsetter for the particular category of digital assets to exclude digital assets having a cumulative number of downloads above a threshold value;
    calculating a respective breakout score for each digital asset in the filtered list of digital assets by counting a number of trendsetters that have downloaded the digital asset;
    ranking the filtered list of digital assets by their respective breakout scores to identify breakout content to recommend to a user;
    generating a visual representation of at least a subset of the filtered list of digital assets based on the ranking and corresponding breakout dates of the digital assets; and
    causing at least one client device to display the visual representation.

2. The method of claim 1, wherein each genre of music in a plurality of genres of music is associated with a different list of trendsetters for the genre of music.

3. The method of claim 2, wherein the particular category of digital assets comprises a first genre of music, the method further comprising:
    generating a second list of digital assets within a second category of digital assets downloaded by at least one trendsetter in one or more trendsetters associated with the second category of digital assets;
    filtering the second list of digital assets downloaded by the at least one trendsetter for the second category of digital assets to exclude digital assets having a cumulative number of downloads above the threshold value; and
    calculating a breakout score for each digital asset in the filtered second list of digital assets by counting a number of trendsetters that have downloaded that digital asset.

4. The method of claim 1, wherein each trendsetter in the one or more trendsetters is a user of a music service that has downloaded at least a threshold number of digital assets prior to a corresponding breakout date for each digital asset in the threshold number of digital assets.

5. The method of claim 1, wherein a breakout date for a digital asset is identified based on a moving average convergence/divergence (MACD) metric.

6. The method of claim 5, wherein the MACD metric is calculated as an exponentially weighted moving average (EWMA) of a difference between a short time frame EWMA and a long time frame EWMA of historical download data.

7. The method of claim 6, wherein the breakout date is identified when the MACD metric increases above a threshold value.

8. The method of claim 1, further comprising adjusting a ranking of digital assets within the particular category of digital assets based on the breakout scores for each digital asset in the filtered list of digital assets.

9. A non-transitory computer readable storage medium configured to store instructions that, when executed by a processor included in a computing device, cause the computing device to identify digital assets to recommend to a user, by carrying out steps that include:
    identifying a set of digital assets within a particular category of digital assets, each digital asset in the set of digital assets having a corresponding breakout date established for the digital asset;
    identifying one or more trendsetters associated with the particular category of digital assets;
    generating a list of digital assets within the particular category of digital assets downloaded by at least one trendsetter in the one or more trendsetters;
    filtering the list of digital assets downloaded by the at least one trendsetter for the particular category of digital assets to exclude digital assets having a cumulative number of downloads above a threshold value;

calculating a respective breakout score for each digital asset in the filtered list of digital assets by counting a number of trendsetters that have downloaded the digital asset;

ranking the filtered list of digital assets by their respective breakout scores to identify breakout content to recommend to the user;

generating a visual representation of at least a subset of the filtered list of digital assets based on the ranking and corresponding breakout dates of the digital assets; and causing at least one client device to display the visual representation.

10. The non-transitory computer readable storage medium of claim 9, wherein each genre of music in a plurality of genres of music is associated with a different list of trendsetters for the genre of music.

11. The non-transitory computer readable storage medium of claim 10, wherein the particular category of digital assets comprises a first genre of music, wherein the steps further include:

generating a second list of digital assets within a second category of digital assets downloaded by at least one trendsetter in one or more trendsetters associated with the second category of digital assets;

filtering the second list of digital assets downloaded by the at least one trendsetter for the second category of digital assets to exclude digital assets having a cumulative number of downloads above the threshold value; and calculating a breakout score for each digital asset in the filtered second list of digital assets by counting a number of trendsetters that have downloaded that digital asset.

12. The non-transitory computer readable storage medium of claim 9, wherein each trendsetter in the one or more trendsetters is a user of a music service that has downloaded at least a threshold number of digital assets prior to a corresponding breakout date for each digital asset in the threshold number of digital assets.

13. A computing device configured to identify digital assets to recommend to a user, the computing device comprising a processor and a memory including instructions that, when executed by the processor, cause the computing device to perform steps that include:

identifying a set of digital assets within a particular category of digital assets, each digital asset in the set of digital assets having a corresponding breakout date established for the digital asset;

identifying one or more trendsetters associated with the particular category of digital assets;

generating a list of digital assets within the particular category of digital assets downloaded by at least one trendsetter in the one or more trendsetters;

filtering the list of digital assets downloaded by the at least one trendsetter for the particular category of digital assets to exclude digital assets having a cumulative number of downloads above a threshold value;

calculating a respective breakout score for each digital asset in the filtered list of digital assets by counting a number of trendsetters that have downloaded the digital asset;

ranking the filtered list of digital assets by their respective breakout scores to identify breakout content to recommend to the user;

generating a visual representation of at least a subset of the filtered list of digital assets based on the ranking and corresponding breakout dates of the digital assets; and causing at least one client device to display the visual representation.

14. The computing device of claim 13, wherein each genre of music in a plurality of genres of music is associated with a different list of trendsetters for the genre of music.

15. The computing device of claim 14, wherein the particular category of digital assets comprises a first genre of music, wherein the steps further include:

generating a second list of digital assets within a second category of digital assets downloaded by at least one trendsetter in one or more trendsetters associated with the second category of digital assets;

filtering the second list of digital assets downloaded by the at least one trendsetter for the second category of digital assets to exclude digital assets having a cumulative number of downloads above the threshold value; and calculating a breakout score for each digital asset in the filtered second list of digital assets by counting a number of trendsetters that have downloaded that digital asset.

16. The computing device of claim 13, wherein each trendsetter in the one or more trendsetters is a user of a music service that has downloaded at least a threshold number of digital assets prior to a corresponding breakout date for each digital asset in the threshold number of digital assets.

* * * * *